(12) United States Patent
Nishiyama et al.

(10) Patent No.: US 12,529,866 B2
(45) Date of Patent: Jan. 20, 2026

(54) LENS APPARATUS, IMAGING APPARATUS, IMAGING SYSTEM, PROCESSING APPARATUS, AND STORAGE MEDIUM

(71) Applicant: CANON KABUSHIKI KAISHA, Tokyo (JP)

(72) Inventors: Mariko Nishiyama, Kanagawa (JP); Kazuya Shimomura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 18/477,294

(22) Filed: Sep. 28, 2023

(65) Prior Publication Data

US 2024/0118517 A1    Apr. 11, 2024

(30) Foreign Application Priority Data

Sep. 29, 2022    (JP) .................. 2022-156673

(51) Int. Cl.
  *G02B 9/60*    (2006.01)
  *G02B 27/00*   (2006.01)
(52) U.S. Cl.
  CPC ........... *G02B 9/60* (2013.01); *G02B 27/0068* (2013.01)
(58) Field of Classification Search
  CPC ........................... G02B 9/60; G02B 27/0068
  See application file for complete search history.

(56) References Cited

FOREIGN PATENT DOCUMENTS

JP    4798221 B2    10/2011
JP    4803224 B2    10/2011

*Primary Examiner* — Jack Dinh
(74) *Attorney, Agent, or Firm* — Canon U.S.A., Inc. IP Division

(57) ABSTRACT

A lens apparatus to be attached to an imaging apparatus includes a storage unit configured to store correction data on distortion aberrations in association with a plurality of focal lengths, and a communication unit configured to transmit the correction data.

19 Claims, 14 Drawing Sheets

LENS APPARATUS, IMAGING APPARATUS, IMAGING SYSTEM, PROCESSING APPARATUS, AND STORAGE MEDIUM

BACKGROUND

Technical Field

One disclosed aspect of the embodiments relates to a lens apparatus, an imaging apparatus, an imaging system, a processing apparatus, and a storage medium.

Description of the Related Art

Visual effects (VFX) technologies for compositing computer graphics (CG) with live-action images require highly-accurate correction of distortion aberrations for affinity between the CG and the live-action images. In capturing a moving image while zooming using a lens apparatus, consistently accurate correction of distortion aberrations over an entire zoom range is required.

Existing technologies for correcting distortion aberrations store correction data regarding a lens apparatus in advance in the lens apparatus or a camera apparatus (imaging apparatus) and determine a correction amount by referring to the correction data. The correction amount is different for each imaging condition (e.g., combination of focal length and object distance) and an image height, so that the amount of the correction data can be enormous. Thus, methods for approximating the correction amount for each imaging condition with a polynomial with respect to the image height and storing coefficients of the polynomial as correction data have been available (Japanese Patent No. 4798221 and Japanese Patent No. 4803224).

According to Japanese Patent No. 4798221, a balance between correction intensity (residual aberration) and information conservation (prevention of loss of information about a peripheral portion of an image) is settable at two or more lens positions (combination of focal position and focal length). According to Japanese Patent No. 4803224, a narrow interval is set for a zoom division point in regions where an amount of distortion associated with zooming changes significantly. Unfortunately, the foregoing methods do not consider the point that certain coefficients exhibit peculiar changes (e.g., certain coefficients have bending points and local maximum points) in accordance with zooming (focal length), in realizing both highly-accurate correction and small data amounts.

SUMMARY

The disclosure is directed to providing a lens apparatus having advantages in, for example, highly-accurate correction of distortion aberrations and small data amounts. According to an aspect of the embodiments, a lens apparatus having a zooming function and configured to be attached to an imaging apparatus, includes a storage unit configured to store correction data regarding distortion aberrations of the lens apparatus, the correction data being in association with a plurality of focal lengths of the lens apparatus, and a communication unit configured to transmit the correction data to the imaging apparatus. The correction data includes a coefficient k1 of a term with a degree of 2, a coefficient k2 of a term with a degree of 4, and a coefficient k3 of a term with a degree of 6 in at least a hexic polynomial with respect to an image height r. Focal lengths fm1 and fm2 are defined as:

$$fm1 = z0.15fw, \text{ and}$$

$$fm2 = z0.5fw,$$

where fw represents a focal length of the lens apparatus at a wide-angle end, ft represents a focal length of the lens apparatus at a telephoto end, and z represents a zoom ratio of the lens apparatus. The plurality of focal lengths includes a focal length in a range greater than or equal to fm1 and less than or equal to fm2, and wherein $$0 \le |At/Aw| < 1$$

is satisfied, where Aw and At are defined as:

$$Aw = (k1m - k1w)/(fm - fw), \text{ and}$$

$$At = (k1t - k1m)/(ft - fm),$$

where fm represents a focal length at which k1 becomes maximum within the range greater than or equal to fm1 and less than or equal to fm2, k1w represents a value of k1 at fw, k1m represents a value of k1 at fm, and k1t represents a value of k1 at ft.

Further features of the disclosure will become apparent from the following description of exemplary embodiments with reference to the attached drawings.

DESCRIPTION OF THE EMBODIMENTS

Figure 1:
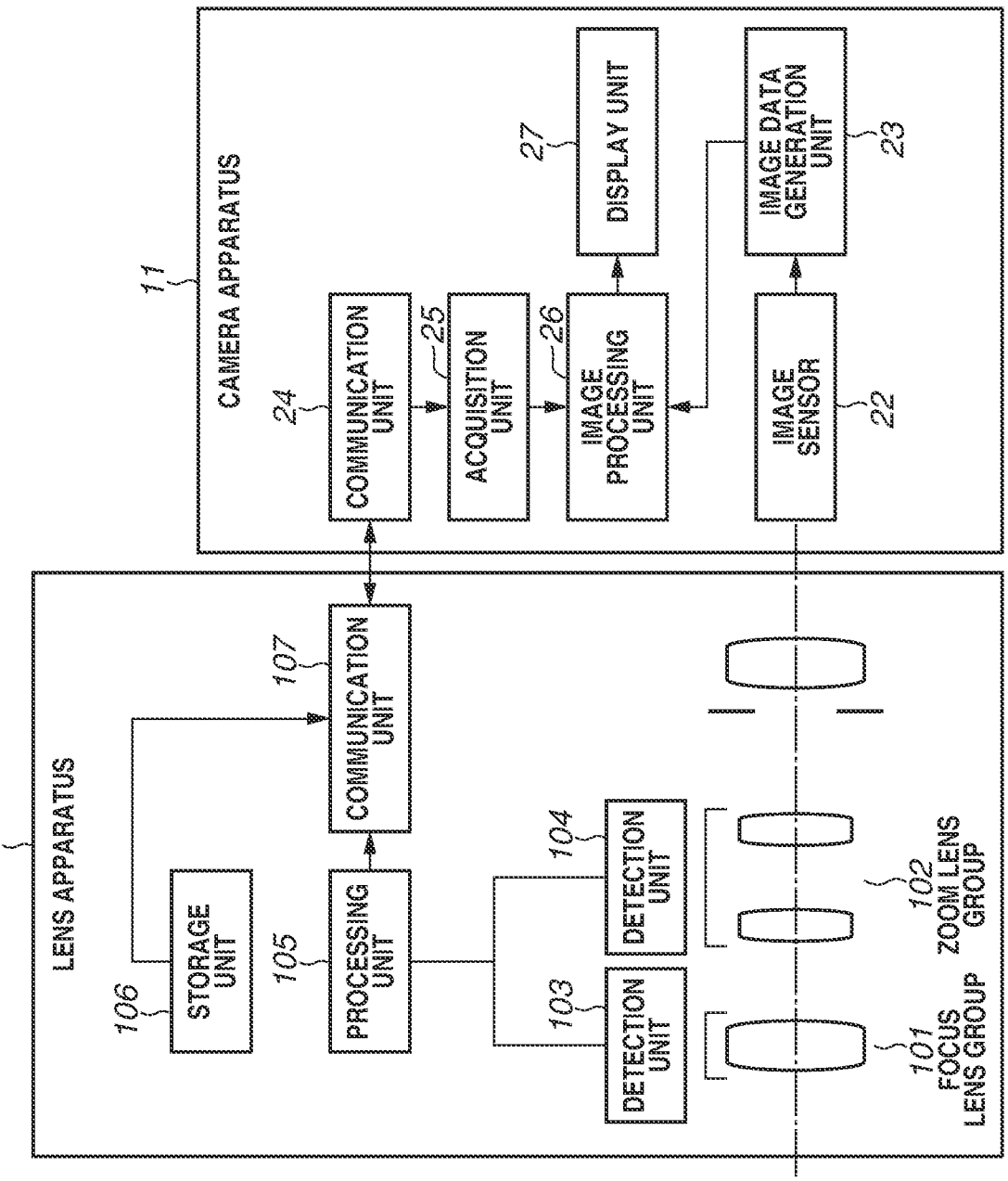
FIG. 1 is a diagram illustrating an example of a configuration of an imaging system according to an exemplary embodiment.

Various exemplary embodiments of the disclosure will be described below with reference to the accompanying drawings. In all the drawings illustrating the exemplary embodiments, unless otherwise specified, corresponding members are given the same reference numeral, and redundant descriptions thereof are omitted. In each sectional view illustrating a zoom lens, an object side is the left-hand side, and an image side is the right-hand side.

An exemplary embodiment of the disclosure will be described below. FIG. 1 is a diagram illustrating an example of a configuration of an imaging system according to a first exemplary embodiment. In FIG. 1, a lens apparatus 10 (zoom lens apparatus) includes a movable optical member (described below). An imaging apparatus (camera apparatus) 11 includes an image sensor (described below), and the lens apparatus 10 is removably attached to the imaging apparatus 11.

The movable optical member of the lens apparatus 10 herein includes a focus lens group 101 for focusing (changing object distance). The focus lens group 101 may include a sub-lens group configured to move independently. The movable optical member herein includes a zoom lens group 102 for zooming (changing focal length). While the lens apparatus 10 in FIG. 1 includes two zoom lens groups 102, the lens apparatus 10 may include three or more zoom lens groups 102. An arrangement of the focus lens group 101 and the zoom lens group 102 of the lens apparatus 10 is not limited to that illustrated in FIG. 1.

A detection unit 103 detects a state of the focus lens group 101. For example, the detection unit 103 detects a position of the focus lens group 101. In a case where the focus lens group 101 includes a plurality of sub-lens groups, a position of at least one of the sub-lens groups is to be detected. A detection unit 104 detects a state of the zoom lens group 102. For example, the detection unit 104 detects a position of the zoom lens group 102. A position of at least one of the plurality of zoom lens groups 102 is to be detected.

A processing unit 105 identifies imaging conditions of the lens apparatus 10 based on detection results from the detection units 103 and 104. The imaging conditions can be, for example, a normalization value (e.g., 0 to $2^{20}$) of a state (e.g., position) of each movable optical member. A maximum value of the normalization value can be different for each type of the movable optical member. In a case where the lens apparatus 10 includes an extender lens group that can be inserted into and removed with respect to an optical path, the lens apparatus 10 may include a detection unit for detecting a state where the extender lens group is inserted or removed. In such a case, the processing unit 105 may identify an imaging condition based on a detection result made by the detection unit. A normalization value of the state of the extender lens group can be, for example, 0 or 1.

A storage unit 106 stores correction data for use by the imaging apparatus 11 in image processing to correct distortions in image data that are caused by distortion aberrations of the lens apparatus 10. The storage unit 106 can be, for example, a read-only memory (non-volatile memory), such as a flash memory. Here, the correction data is generated based on the distortion aberrations of the lens apparatus 10, and details thereof will be described below.

A communication unit 107 communicates with the imaging apparatus 11. The communication unit 107 can be formed by a single processor (e.g., central processing unit (CPU)) or a plurality of processors together with or separately from the processing unit 105.

An image sensor 22 of the imaging apparatus 11 captures (images) an image (optical image) formed by the lens apparatus 10. The image sensor 22 can include, for example, a complementary metal-oxide semiconductor (CMOS) image sensor. An image data generation unit 23 generates image data based on outputs from the image sensor 22. A communication unit 24 is used for communicating with the lens apparatus 10. An acquisition unit 25 acquires a correction amount for the image data, based on the correction data and the imaging conditions. An image processing unit 26 corrects the image data, based on the correction amount. A display unit 27 displays the corrected image data and can include, for example, a liquid crystal monitor. The communication unit 24, the acquisition unit 25, and the image processing unit 26 can include, for example, a single processor (e.g., CPU) or a plurality of processors. An optical image formed by the lens apparatus 10 is photoelectrically converted into an electric signal by the image sensor. The image data generation unit 23 generates image data, based on the electric signal, and the image processing unit 26 corrects the generated image data. The display unit 27 displays the corrected image data.

In a case where the correction amount acquired by the acquisition unit 25 is for cancelling the distortion aberrations of the lens apparatus 10, the correction amount compensates for the distortion aberrations, whereas in a case where the acquired correction amount is for providing distortions, the correction amount can provide the distortions to an image that is unaffected by the distortion aberrations, such as an computer graphics (CG) image. The image data acquired using the correction amount by the image processing unit 26 is displayed on the display unit 27.

Figure 2:
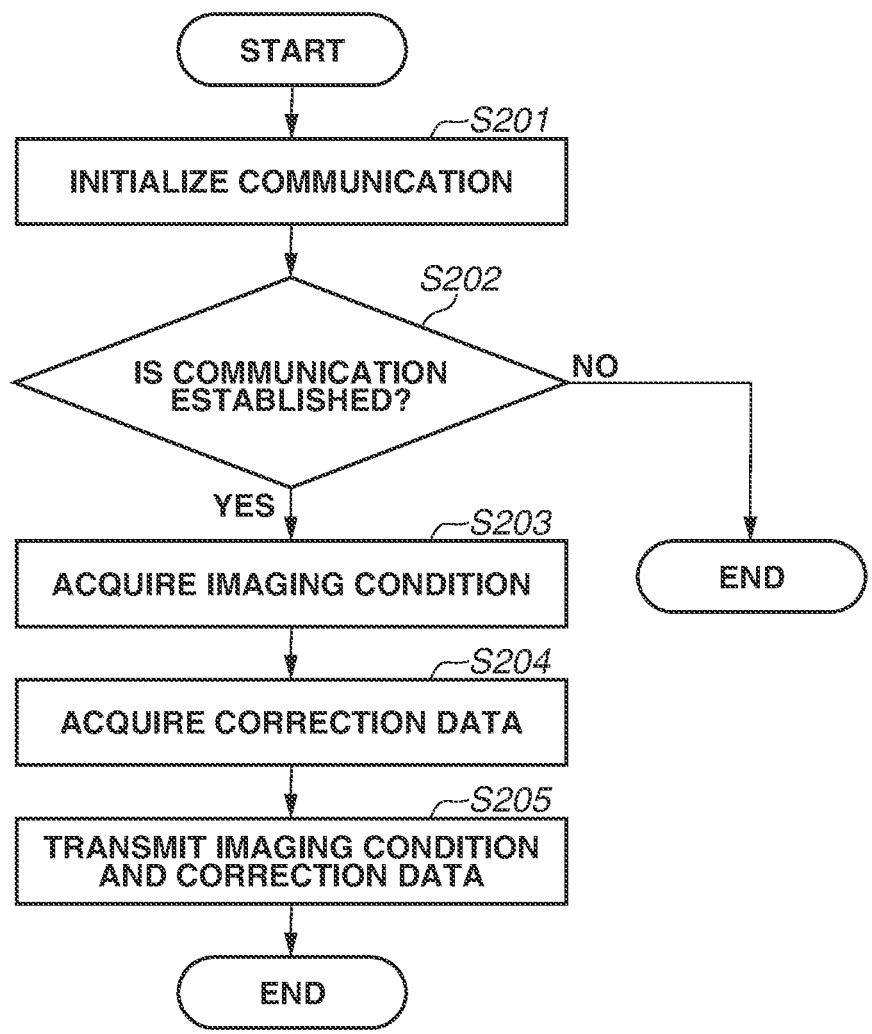
FIG. 2 is a diagram illustrating an example of a flowchart of processing according to an exemplary embodiment.

A process of acquiring a correction amount by the lens apparatus 10 will be described below. FIG. 2 is a diagram illustrating processing according to an exemplary embodiment. The processing is performed by, but not limited to, the processing unit 105. After the lens apparatus 10 is attached to the imaging apparatus 11 and the imaging apparatus 11 supplies power to the lens apparatus 10, initially in step S201, a communication initialization operation is started. Then in step S202, the processing unit 105 determines whether communication is established between the lens apparatus 10 and the imaging apparatus 11. If the processing unit 105 determines that the communication is not established (NO in step S202), the processing is ended. If the processing unit 105 determines that the communication is established (YES in step S202), the processing proceeds to step S203.

In step S203, imaging conditions (e.g., zoom state [e.g., position of the zoom lens group 102] and focus state [e.g., position of the focus lens group 101]) are acquired. In step S204, the correction data stored in the storage unit 106 is acquired based on the acquired imaging condition. In step S205, information about the imaging conditions and the correction data is transmitted to the imaging apparatus 11 via the communication unit 107. Here, the correction data is stored in association with the imaging conditions and an image height in the storage unit 106. In order to reduce the data amount, the correction data is stored in association with discrete imaging conditions in the storage unit 106. The correction data (here, correction data regarding distortions) D(Z, F, r) is expressed by, for example, the following nth-degree polynomial (n is a non-negative integer) with respect to an image height r:

$$D(Z,F,r)=k_n(Z,F) \cdot r^n + k_{n-1}(Z,F) r^{n-1} + \ldots + k_0(Z,F) \cdot r^0,$$

where Z is the zoom state, F is the focus state, and r is the image height.

The storage unit 106 stores the coefficients $k_n(Z, F)$, $k_{n-1}(Z, F)$, ..., and $k_0(Z, F)$ of the nth-degree polynomial (nth-degree function).

The imaging apparatus 11 acquires, based on the information about the imaging conditions and the correction data (discrete information with respect to the imaging conditions) transmitted from the lens apparatus 10, a correction amount corresponding to the imaging conditions transmitted from the lens apparatus 10. Here, in a case where the transmitted imaging conditions are different from the imaging conditions in association with the transmitted correction data, a correction amount corresponding to the transmitted imaging conditions is acquired by performing interpolation processing on the transmitted correction data. The interpolation can be, for example, linear interpolation. The interpolation can be something other than linear interpolation, such as nearest-neighbor interpolation or spline interpolation. The imaging apparatus 11 performs image data correction (e.g., compensation for the distortion aberrations) based on the correction amount corresponding to the transmitted imaging conditions.

In step S205, the information about the imaging conditions and the correction data that corresponds to frames of the image data acquired by the imaging apparatus 11 is transmitted from the lens apparatus 10 to the imaging apparatus 11. The operation in step S205 is not limited to such an operation. After communication is established between the lens apparatus 10 and the imaging apparatus 11, the entire information about the correction data may be transmitted at one time from the lens apparatus 10 to the imaging apparatus 11 and stored in the imaging apparatus 11, and the imaging conditions may be transmitted in units of frames of image data from the lens apparatus 10 to the imaging apparatus 11. The imaging apparatus 11 then may acquire a correction amount corresponding to the imaging conditions received in units of frames from the lens apparatus 10 through interpolation processing based on the entire information about the correction data received in advance. The entire information about the correction data may be stored in advance in a storage unit of the imaging apparatus 11 without going through the lens apparatus 10, and the imaging conditions may be transmitted in units of frames of image data from the lens apparatus 10 to the imaging apparatus 11. The imaging apparatus 11 may acquire a correction amount corresponding to the imaging conditions received in units of frames from the lens apparatus 10 through interpolation processing based on the entire information about the correction data received in advance.

An apparatus that performs the image data correction (e.g., compensation for the distortion aberrations) is not limited to the imaging apparatus 11. The image data correction (e.g., compensation for the distortion aberrations) can be performed also by another processing apparatus different from the imaging apparatus 11. In such a case, the processing apparatus can include a communication unit, an acquisition unit, and an image processing unit that are similar to those of the imaging apparatus 11. The processing apparatus can include, for example, a personal computer (PC).

Next, a method for generating coefficients of an nth-degree polynomial will be described below. In a case where the distortion aberrations are expressed with an nth-degree polynomial with respect to the image height, terms having lower degrees have a great effect in the vicinity of a central image height (image height 0: r=0), whereas terms having higher degrees have a great effect in the vicinity of a maximum image height. Thus, in order to express the distortion aberrations with high accuracy, it is desirable to use a polynomial including terms having degrees ranging from lower to higher. According to the present exemplary embodiment, the distortion aberrations are expressed (approximated) by the following polynomial (1), which is a hexic polynomial including terms having degrees of 2, 4, and 6:

$$D(r)=k_1 \cdot r^2 + k_2 \cdot r^4 + k_3 \cdot r^6 \qquad (1).$$

Adding terms with degrees of 8 and 10 to this polynomial (changing the polynomial to $D(r)=k_1 \cdot r^2 + k_2 \cdot r^4 + k_3 \cdot r^6 + \ldots$) has little effect on the accuracy of distortion aberration approximation and below-described conditional inequalities. A typical method (e.g., least-squares method) is applicable to express the distortion aberrations with the polynomial (1) and calculate the coefficients of each term. Whichever method is used to determine the coefficients, in order to allow coefficient interpolation errors with respect to discrete focal lengths serving as an imaging condition, characteristic changes in the distortion aberrations caused by a change in the focal length are to be taken into consideration. For example, it is desirable that the point that certain coefficients exhibit peculiar changes (e.g., certain coefficients have bending points and local maximum points) in accordance with zooming (focal length) be taken into account. More specifically, it is desirable that the coefficients of the polynomial be determined so as to satisfy the below-described conditional inequalities, so that an interpolation error of coefficients in the entire zoom range falls within tolerance, even for the coefficients ($k_i$: i=2, 4, 6) of the polynomial D(r) acquired with respect to the discrete focal lengths. It is desirable that the correction data include the coefficient $k_1$ of the term with a degree of 2, the coefficient $k_2$ of the term with a degree of 4, and the coefficient $k_3$ of the term with degree of 6 in the at least a hexic polynomial with respect to the image height r. The at least hexic polynomial is desirably, but not limited to, a polynomial including terms having degrees of even-numbers in a case where a target optical system is symmetrical to an optical axis.

The lens apparatus 10 includes the communication unit 107 configured to transmit, to the imaging apparatus 11, correction data for correcting (compensating for) the distortion aberrations of the lens apparatus 10 in images acquired by the imaging apparatus 11 or correction data for adding the distortion aberrations of the lens apparatus 10 to CG images. The correction data includes the coefficients $k_1$, $k_2$, and $k_3$ when the correction amount with respect to the image height r is expressed (approximate) using the foregoing polynomial (1):

$$D(r)=k_1 \cdot r^2 + k_2 \cdot r^4 + k_3 \cdot r^6.$$

Each coefficient is associated with an imaging condition. The correction data satisfies the following conditional inequality:

$$0 \leq |A_t/A_w| < 1 \qquad (2).$$

In the conditional inequality (2), a focal length of the lens apparatus 10 at a wide angle end is represented by fw, and a focal length of the lens apparatus 10 at a telephoto end is represented by ft. A zoom ratio is represented by z(=ft/fw). Focal lengths fm1 and fm2 are respectively defined as:

$$fm1 = z^{0.15} fw; \text{ and}$$

$$fm2 = z^{0.5} fw.$$

In the range of fm1≤f≤fm2, at least one focal length f is associated with the correction data, and a focal length fm at which $k_1$ reaches becomes maximum within this range satisfies:

$$fm1 \leq fm \leq fm2 \qquad (3).$$

Values of $k_1$ at fm, fw, and ft are represented by $k_{1m}$, $k_{1w}$, and $k_{1t}$. $A_w$ and $A_t$ are defined as, respectively:

$$A_w=(k_{1m}-k_{1w})/(fm-fw); \text{ and}$$

$$A_t=(k_{1t}-k_{1m})/(ft-fm).$$

The conditional inequality (2) defines the absolute value of the ratio of a slope of $k_1$ at a telephoto side with respect to the focal length fm to a slope of $k_1$ at a wide-angle side with respect to the focal length fm. Since the coefficient $k_1$ of the term having a degree of 2 provides a great contribution to the vicinity of an image height of zero, if the conditional inequality (2) is not satisfied, the accuracy (reproducibility) of the correction amount with respect to a central portion (the vicinity of the center) of an image cannot be allowed. In particular, the accuracy at the wide-angle side with respect to the focal length fm, at which the absolute value of the slope of the coefficient $k_1$ is great cannot be allowed. The conditional inequality (2) can be expressed as:

$$0 \leq |A_t|/A_w < 1 \tag{2}'$$

in a case where $A_w > 0$.

It is desirable that the correction data satisfy the following conditional inequality:

$$k_{1t}/k_{1w} < 0 \tag{4}$$

In the conditional inequality (4) indicates that the sign of the coefficient $k_1$ of term having a degree of 2 in the polynomial differs between the wide angle end and the telephoto end. For a zoom lens that exhibits negative distortion aberrations at the wide angle end and positive distortion aberrations at the telephoto end, if the conditional inequality (4) is not satisfied, the accuracy (reproducibility) of the correction amount with respect to a central portion of an image at the telephoto side cannot be allowed. It is possible that $k_{1w} < 0$.

It is further desirable that the correction data satisfies the following conditional inequality:

$$0 < |B_t/B_w| < 1 \tag{5}$$

Values of $k_2$ at fm, fw, and ft are represented by $k_{2m}$, $k_{2w}$, and $k_{2t}$. $B_w$ and $B_t$ are respectively defined as:

$$B_w=(k_{2m}-k_{2w})/(fm-fw), \text{ and}$$

$$B_t=(k_{2t}-k_{2m})/(ft-fm).$$

The conditional inequality (5) defines the absolute value of the ratio of a slope of $k_2$ at the telephoto side with respect to the focal length fm to a slope of $k_2$ at the wide-angle side with respect to the focal length fm. Since the coefficient $k_2$ of the term with a degree of 4 provides a great contribution to the vicinity of the maximum image height, if the conditional inequality (5) is not satisfied, the accuracy (reproducibility) with respect to a peripheral portion of an image cannot be allowed. In particular, the accuracy at the wide angle side with respect to the focal length fm, at which the absolute value of the slope of the coefficient $k_2$ is great, cannot be allowed. The conditional inequality (5) can be expressed as:

$$0 < |B_t|/(-B_w) < 1 \tag{5}'$$

in a case where $B_w < 0$.

It is desirable that the correction data satisfy the following conditional inequality:

$$-0.3 \leq k_{2t}/k_{2w} \leq 0.1 \tag{6}$$

The conditional inequality (6) defines the ratio of the coefficient $k_{2t}$ of the term with a degree of 4 at the telephoto end to the coefficient $k_{2w}$ of the term with a degree of 4 at the wide angle end. For a zoom lens that exhibits negative distortion aberrations at the wide-angle end and positive distortion aberrations at the telephoto end, if the conditional inequality (6) is not satisfied, the accuracy (reproducibility) of the correction amount with respect to a peripheral portion of an image at the telephoto side cannot be allowed. It is possible that $k_{2w} > 0$.

It is desirable that the correction data satisfy the following conditional inequalities:

$$-0.1 \leq k_{2w}/k_{1w} < 0 \tag{7-1}$$

and $$-0.02 \leq k_{2t}/k_{1t} \leq 0.01 \tag{7-2}$$

The conditional inequality (7-1) defines the ratio of $k_2$ at the wide angle end to $k_1$ at the wide angle end. The conditional inequality (7-2) defines the ratio of $k_2$ at the telephoto end to $k_1$ at the telephoto end. If the conditional inequality (7-1) is not satisfied with respect to the upper limit, $k_{2w}$ becomes less than or equal to zero, and the accuracy of the correction amount with respect to a peripheral portion of an image cannot be allowed. If the conditional inequality (7-1) is not satisfied with respect to the lower limit, either $k_{2w}$ becomes excessively great or $k_{1w}$ becomes excessively small, and the accuracy of the correction amount with respect to a peripheral portion or a central portion of an image cannot be allowed. If the conditional inequality (7-2) is not satisfied with respect to the upper limit, either $k_{2t}$ becomes excessively great or $k_{1t}$ becomes excessively small, and the accuracy of the correction amount with respect to a peripheral portion or a central portion of an image cannot be allowed. If the conditional inequality (7-2) is not satisfied with respect to the lower limit, either $k_{2t}$ or $k_{1t}$ becomes excessively small, and the accuracy of the correction amount with respect to a peripheral portion or a central portion of an image cannot be allowed. It is possible that $k_{1w} < 0$, and $k_{1t} > 0$.

It is desirable that the correction data satisfy the following conditional inequality:

$$0 < |C_t/C_w| < 1 \tag{8}$$

Values of $k_3$ at fm, fw, and ft are represented by $k_{3m}$, $k_{3w}$, and $k_{3t}$, respectively. Further, $C_w$ and $C_t$ are respectively defined as:

$$C_w=(k_{3m}-k_{3w})/(fm-fw) \text{ and,}$$

$$C_t=(k_{3t}-k_{3m})/(ft-fm).$$

The conditional inequality (8) defines the absolute value of the ratio of a slope of $k_3$ at the telephoto side with respect to the focal length fm to a slope of $k_3$ at the wide-angle with respect to the focal length fm. Since the coefficient $k_3$ of the term having a degree of 6 provides a great contribution to the vicinity of the maximum image height, if the conditional inequality (8) is not satisfied, the accuracy (reproducibility) of the correction amount with respect to a peripheral portions of an image cannot be allowed. In particular, the accuracy at the wide-angle side with respect to the focal length fm, at which the absolute value of the slope of the coefficient $k_3$ is great, cannot be allowed. The conditional inequality (8) can be expressed as:

$$0 < |C_t|/C_w < 1 \tag{8}'$$

in a case where $C_w > 0$.

It is desirable that the correction data satisfy the following conditional inequality:

$$-0.3 \leq k_{3t}/k_{3w} \leq 0.1 \tag{9}$$

The conditional inequality (9) defines the ratio of the coefficient $k_{3t}$ of the term having a degree of 6 at the telephoto end to the coefficient $k_{3w}$ of the term having a degree of 6 at the wide-angle end. For a zoom lens that exhibits negative distortion aberrations at the wide-angle end and positive distortion aberrations at the telephoto end, if the conditional inequality (9) is not satisfied, the accuracy (reproducibility) of the correction amount with respect to a peripheral portion of an image at the telephoto side cannot be allowed. It is possible that $k_{3w}<0$.

It is desirable that a zoom lens according to the present exemplary embodiment include a first lens group that is disposed closest to the object, configured not to move for zooming, and has positive refractive power, while at least part of the first lens group moves for focusing.

It is desirable that the correction data satisfy the following conditional inequality:

$$-1 < A_t/A_w < 0 \tag{10}$$

The conditional inequality (10) indicates that the signs of $A_w$ and $A_t$ are different. The conditional inequality (10) further indicates that in a case where $A_w>0$, the slope of $k_1$ at the telephoto side with respect to the focal length fm is negative. The zoom lens including the first lens group disposed closest to the object, configured not to move for zooming, and having positive refractive power, with at least part of the first lens group configured to move for focusing, has barrel distortion aberrations at the wide-angle end. At or in the vicinity of the focal length fm, off-axis flux travels through peripheral portions, away from the optical axis, in a lens (e.g., a lens having at least a portion that belongs to the image side of the center of the first lens group in an optical axis direction) in the first lens group, so that the absolute value of pincushion distortion aberrations becomes maximum. From the focal length fm or the vicinity of the focal length fm to the telephoto end, the absolute value of the pincushion distortion aberrations decreases to a particular pincushion distortion aberration. For the foregoing zoom lens, if the conditional inequality (10) is not satisfied, the accuracy (reproducibility) of the correction amount in the entire zooming range from the wide-angle end to the telephoto end cannot be allowed.

For the correction data, it is desirable that a focal length fm' at which $k_1$ becomes maximum satisfies the following conditional inequality:

$$fm1' \leq fm' \leq fm2' \tag{11}$$

The focal lengths fm1' and fm2' are defined, respectively:

$$fm1' = z^{0.20} f_w, \text{ and}$$

$$fm2' = z^{0.45} f_w.$$

The conditional inequality (11) defines the focal length at which the coefficient $k_1$ becomes maximum in the entire zoom range. If the conditional inequality (11) is not satisfied, the accuracy (reproducibility) of the correction amount in the entire zooming range, in particular, the accuracy (reproducibility) of the correction amount in the zooming range at the wide-angle side at which the distortion aberrations change significantly, cannot be allowed.

It is desirable that correction data corresponding to D that satisfies the following conditional inequality be present:

$$D/D\text{ max} \geq 0.90 \tag{12}$$

D max represents a maximum distortion aberration in the entire zoom range at each object distance for the zoom lens. D represents a maximum distortion aberration among the distortion aberrations corresponding to the correction data.

With the conditional inequality (12) being satisfied, the zoom lens that is advantageous in the accuracy (reproducibility) of the correction amount in the entire zooming range is provided.

It is desirable that the correction data satisfy the following conditional inequality:

$$0 \leq x \leq 0.5d \tag{13}$$

In the conditional inequality (13), d represents a movement amount of the sub-lens group of the first lens group in focusing from infinity to the closest distance. The correction data according to the present exemplary embodiment corresponds to the sub-lens group that satisfies the conditional inequality (13), at a movement amount x of the sub-lens group in focusing from infinity to the closest distance. This is because the lens apparatus 10 significantly exhibits the relationships between the coefficients of the polynomial and the focal lengths as illustrated in FIGS. 5A to 5C, 8, 11, and 14, in a case where the conditional inequality (13) is satisfied.

It is desirable that the conditional inequalities (2), (4) to (9), and (12) described above be changed into the following conditional inequalities, which are more effective:

$$0 \leq |A_t/A_w| \leq 0.1 \tag{2a}$$

$$k_{1t}/k_{1w} \leq -0.05 \tag{4a}$$

$$0 \leq |B_t/B_w| \leq 0.1 \tag{5a}$$

$$-0.25 \leq k_{2t}/k_{2w} \leq 0.01 \tag{6a}$$

$$-0.06 \leq k_{2w}/k_{1w} < 0 \tag{7-1a}$$

$$-0.015 \leq k_{2t}/k_{1t} \leq 0.01 \tag{7-2a}$$

$$0 \leq |C_t/C_w| \leq 0.1 \tag{8a}$$

$$-0.3 \leq k_{3t}/k_{3w} \leq 0.01 \tag{9a}$$

$$D/D\text{ max} \geq 0.93 \tag{12a, and}$$

$$D/D\text{ max} \geq 0.96 \tag{12b}$$

The conditional inequality with a reference numeral that ends with the letter "a" ( . . . a) is more effective than its corresponding conditional inequality with a reference numeral that ends with the letter "b" ( . . . b).

Example 1

A zoom lens (optical system) of a lens apparatus according to the exemplary embodiment will be described below. The zoom lens includes a first lens group, a plurality of movable lens groups, and a final lens group, in this order from the object side toward the image side. Each distance between adjacent lens groups of the zoom lens changes for zooming. The first lens group has positive refractive power and does not move for zooming. The first lens group includes a sub-lens group, and the sub-lens group moves for focusing. The final lens group does not move for zooming. The zoom lens includes an aperture stop SP.

Figure 3:
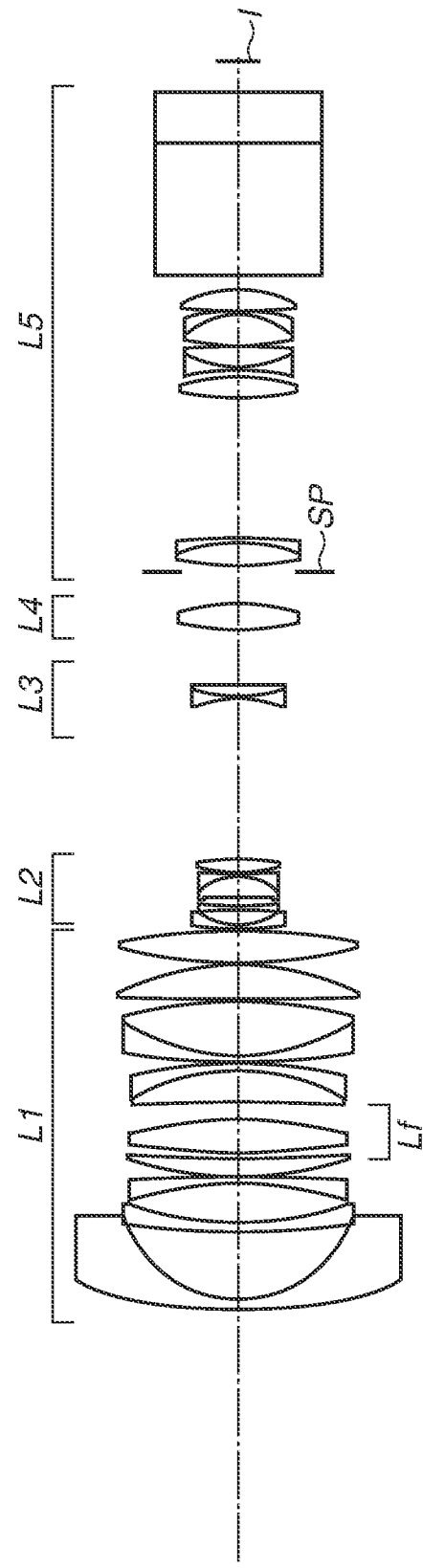
FIG. 3 is a sectional view illustrating a zoom lens according to Example 1.

A zoom lens (optical system) of a lens apparatus according to Example 1 will be described below. FIG. 3 is a sectional view illustrating the zoom lens according to Example 1 at infinity focus and at the wide-angle end. The zoom lens includes lens groups L1 to L5, in this order from the object side toward the image side. The zoom lens includes the aperture stop SP disposed closer to the image plane than the lens group L4 is to the image plane. On an image plane I, an imaging surface of the image sensor that captures (images) an image formed by the zoom lens is disposed. Glass blocks, such as, but not limited to, a color splitting prism and a filter, are provided between the zoom lens and the image plane I.

In FIG. 3, the first lens group consists of the lens group L1. The first lens group L1 includes a sub-lens group Lf which is moved for focusing. The sub-lens group Lf includes two lenses each having positive refractive power. The plurality of movable lens groups consists of the lens groups L2 to L4, in this order from the object side toward the image side. The lens group L2 has negative refractive power and is moved toward the image plane for zooming from the wide-angle end to the telephoto end. The lens group L3 has negative refractive power and is moved first toward the object and thereafter toward the image plane for zooming from the wide-angle end to the telephoto end. The lens group L4 has positive refractive power. The final lens group consists of the lens group L5. The aperture stop SP does not move with (in conjunction with) zooming.

The lens group L2 is a principal lens group that handles zooming. The lens group L4 is moved toward the image plane for zooming from the wide-angle end to an intermediate zoom state where the lens groups L2 and L3 approach each other the most, whereas the lens group L4 is moved toward the object for zooming from the intermediate zoom state to the telephoto end.

Figure 4A:
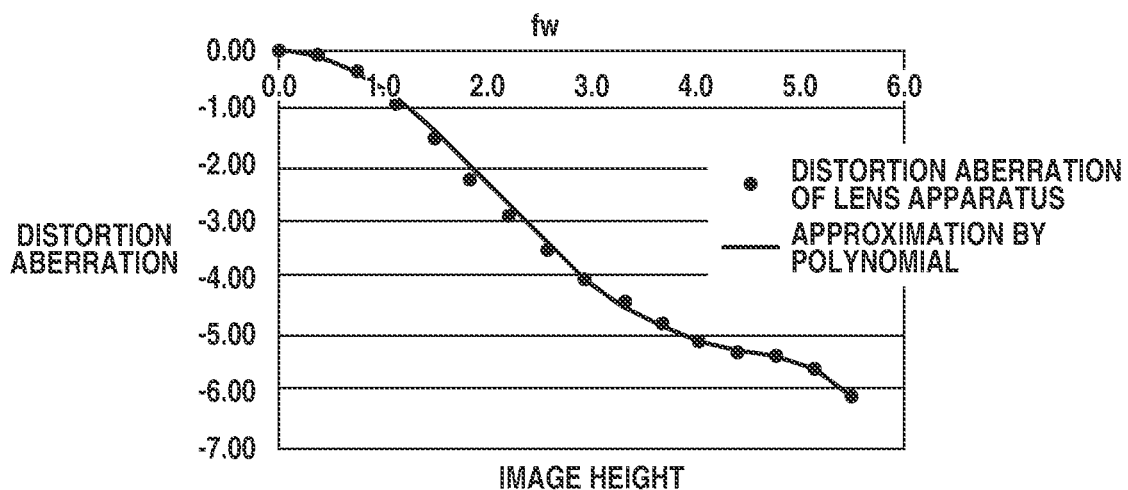
FIGS. 4A to 4C are diagrams illustrating distortion aberrations of the zoom lens according to Example 1 and polynomial approximation.
Figure 4B:
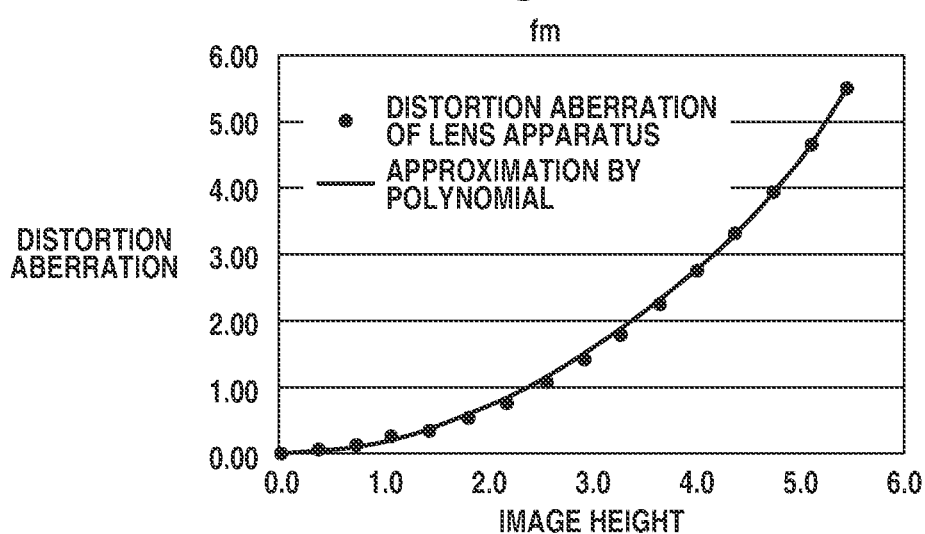
Figure 4C:
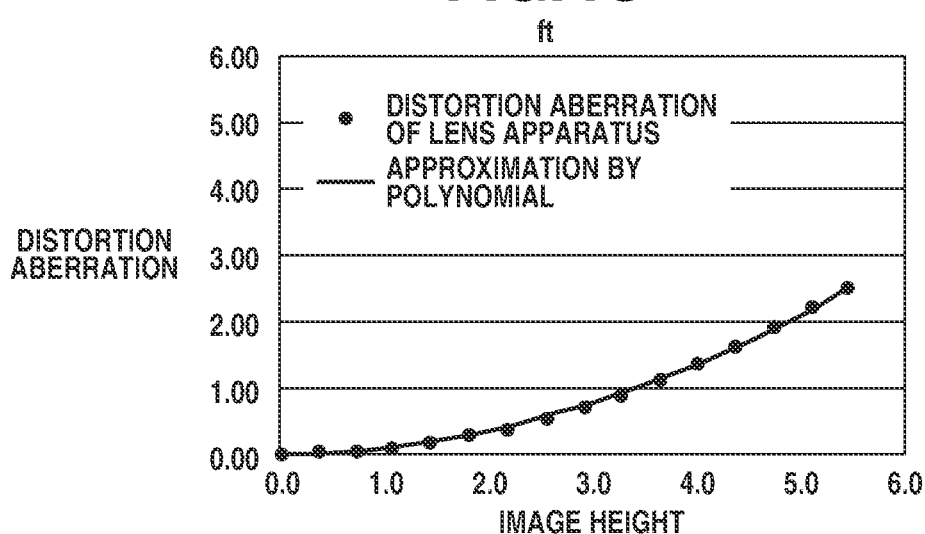
Figure 5A:
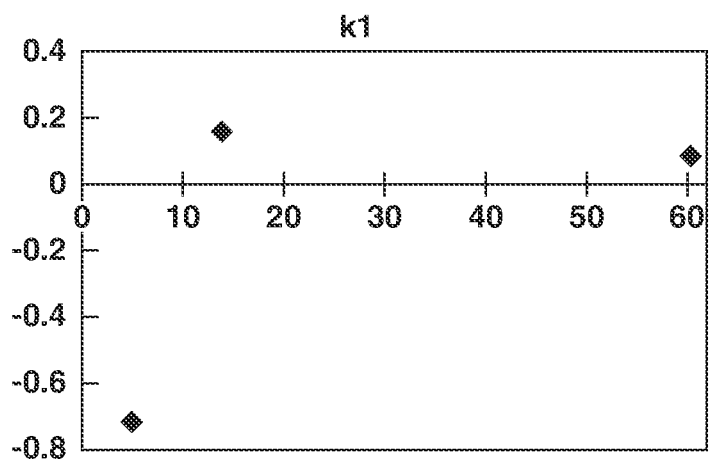
FIGS. 5A to 5C are diagrams illustrating relationships between coefficients of the polynomial and focal lengths according to Example 1.
Figure 5B:
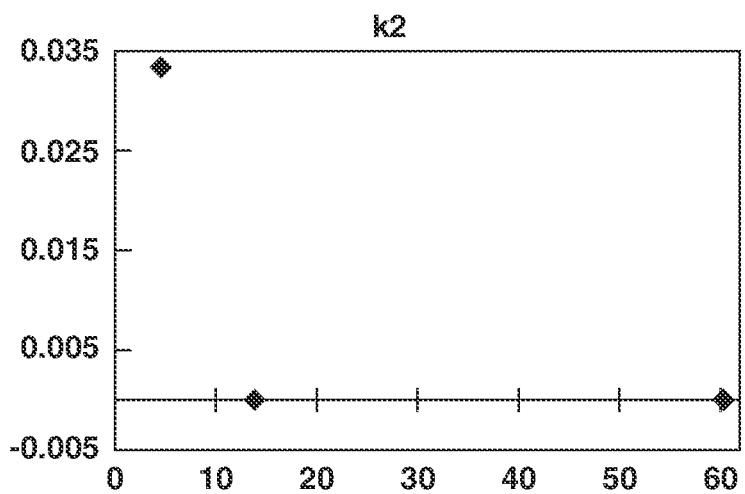
Figure 5C:
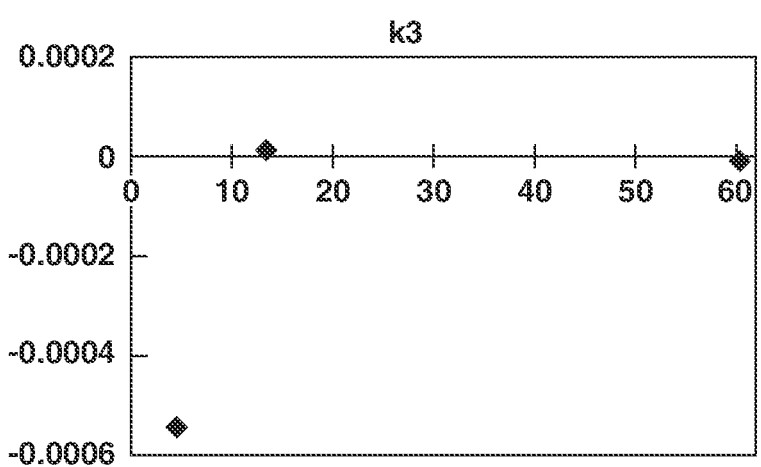

FIGS. 4A to 4C are diagrams illustrating distortion aberrations of the zoom lens according to Example 1 and polynomial approximation. In FIGS. 4A to 4C, points represent distortion aberrations of the zoom lens according to Example 1, and solid lines represent correction amounts expressed (approximated) using the polynomial (1). Values of the coefficients of the polynomial (1) are presented in Table 1, and values of the conditional inequalities are presented in Table 2. Relationships between the coefficients $k_1$, $k_2$, and $k_3$ of the polynomial and the focal lengths are illustrated in FIGS. 5A to 5C.

Example 1 satisfies all of the conditional inequalities (3) to (11), distortion aberrations (correction amounts) are expressed accurately from a central image height (image height 0 mm) to a maximum image height (image height 5.5 mm) at every focal length (fw, fm, ft), as illustrated in FIGS. 4A to 4C. It is not essential for the present exemplary embodiment to satisfy the conditional inequalities (4) to (11). In a case where at least one of the conditional inequalities (4) to (11) is further satisfied in addition to the conditional inequality (3), the corresponding advantage described above is further produced. This applies to other examples, similarly.

Example 2

Figure 6:
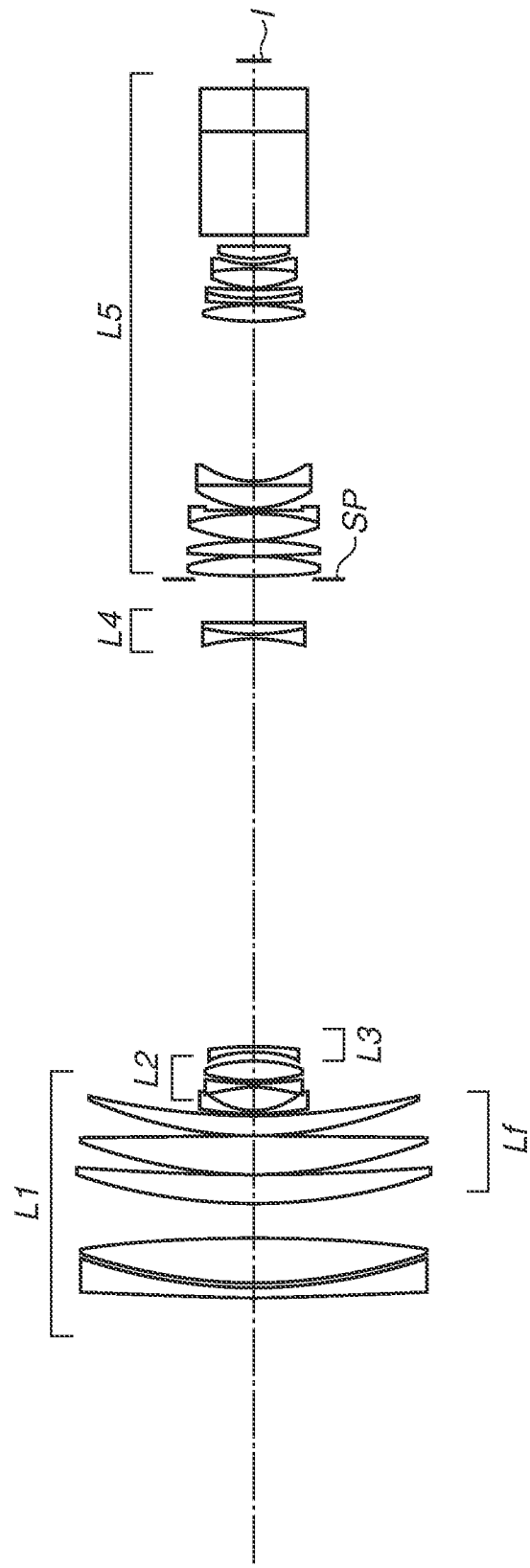
FIG. 6 is a sectional view illustrating a zoom lens according to Example 2.

A zoom lens (optical system) of a lens apparatus according to Example 2 will now be described below. FIG. 6 is a sectional view illustrating the zoom lens according to Example 2 at infinity focus and at the wide-angle end. The zoom lens includes the lens groups L1 to L5, in this order from the object side toward the image side. The zoom lens includes the aperture stop SP disposed closer to the image plane than the lens group L4 is to the image plane. On an image plane I, the imaging surface of the image sensor that captures (images) an image formed by the zoom lens is disposed. Glass blocks, such as, but not limited to, a color splitting prism and a filter, are provided between the zoom lens and the image plane I.

In FIG. 6, the first lens group consists of the lens group L1. The first lens group L1 includes the sub-lens group Lf which is moved for focusing. The sub-lens group Lf includes three lenses each having positive refractive power. The plurality of movable lens groups consists of the lens groups L2 to L4, in this order from the object side toward the image side. The lens groups L2 and L3 each have negative refractive power and is moved toward the image plane for zooming from the wide-angle end to the telephoto end. The lens group L2 is a principal lens group that handles zooming. The lens group L4 has negative refractive power and is moved to reduce an image plane movement in zooming from the wide-angle end to the telephoto end. The final lens group consists of the lens group L5. The aperture stop SP does not move with (in conjunction with) zooming.

Figure 7A:
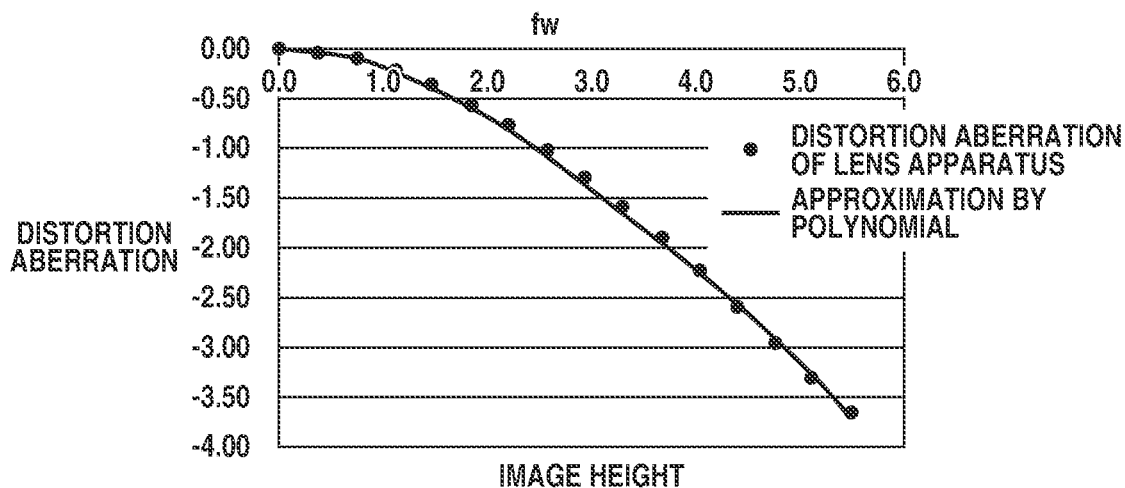
FIGS. 7A to 7C are diagrams illustrating distortion aberrations of the zoom lens according to Example 2 and polynomial approximation.
Figure 7B:
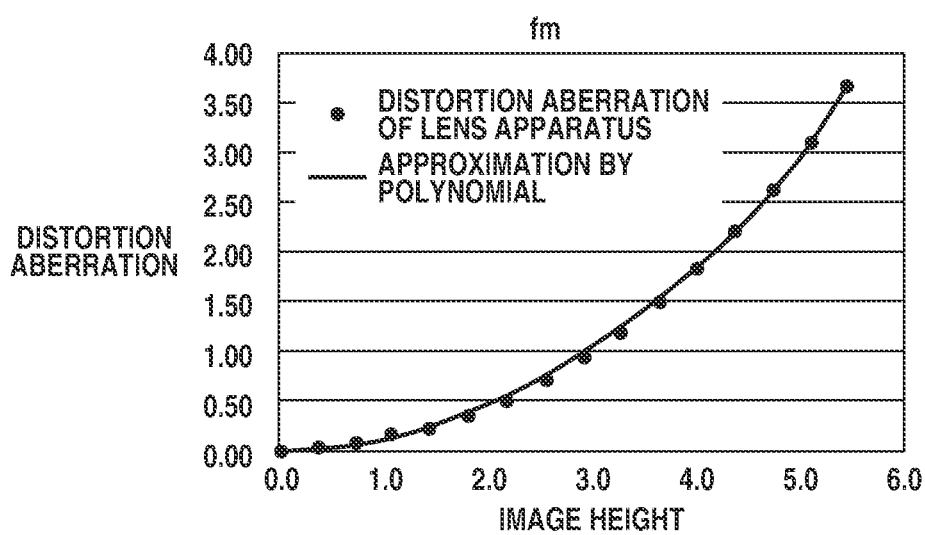
Figure 7C:
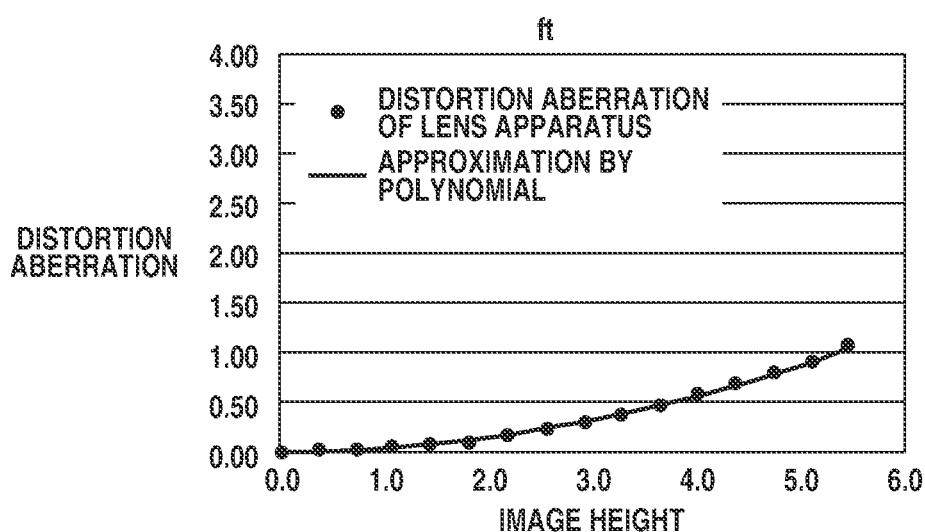
Figure 8A:
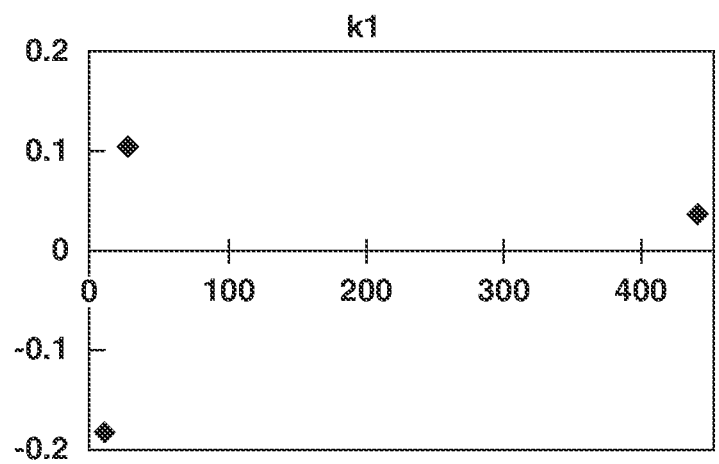
FIGS. 8A to 8C are diagrams illustrating relationships between coefficients of the polynomial and focal lengths according to Example 2.
Figure 8B:
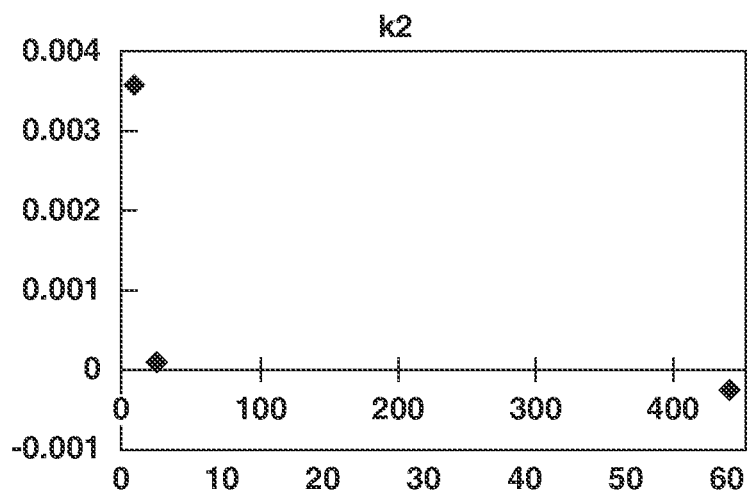
Figure 8C:
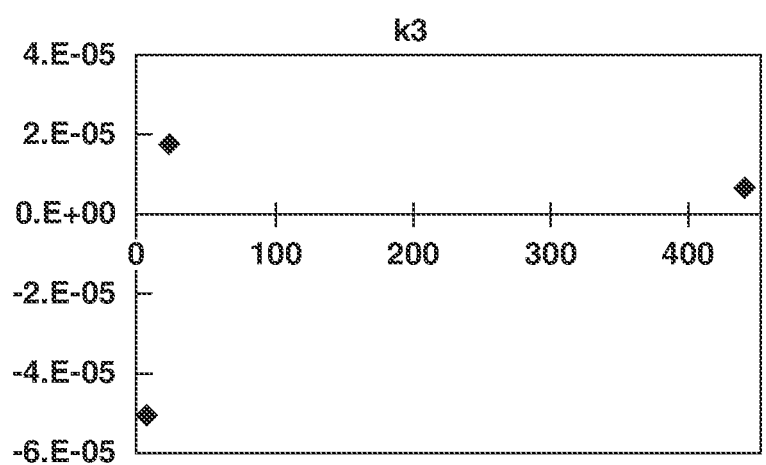

FIGS. 7A to 7C are diagrams illustrating distortion aberrations of the zoom lens according to Example 2 and polynomial approximation. In FIGS. 7A to 7C, points represent distortion aberrations of the zoom lens according to Example 2, and solid lines represent correction amounts expressed (approximated) using the polynomial (1). Values of the coefficients of the polynomial (1) are presented in Table 1, and values of the conditional inequalities are presented in Table 2. Relationships between the coefficients $k_1$, $k_2$, and $k_3$ of the polynomial and the focal lengths are illustrated in FIGS. 8A to 8C.

Example 2 satisfies all of the conditional inequalities (3) to (11), and distortion aberrations (correction amounts) are expressed accurately from the central image height (image height 0 mm) to the maximum image height (image height 5.5 mm) at every focal length (fw, fm, ft), as illustrated in FIGS. 7A to 7C.

Example 3

Figure 9:
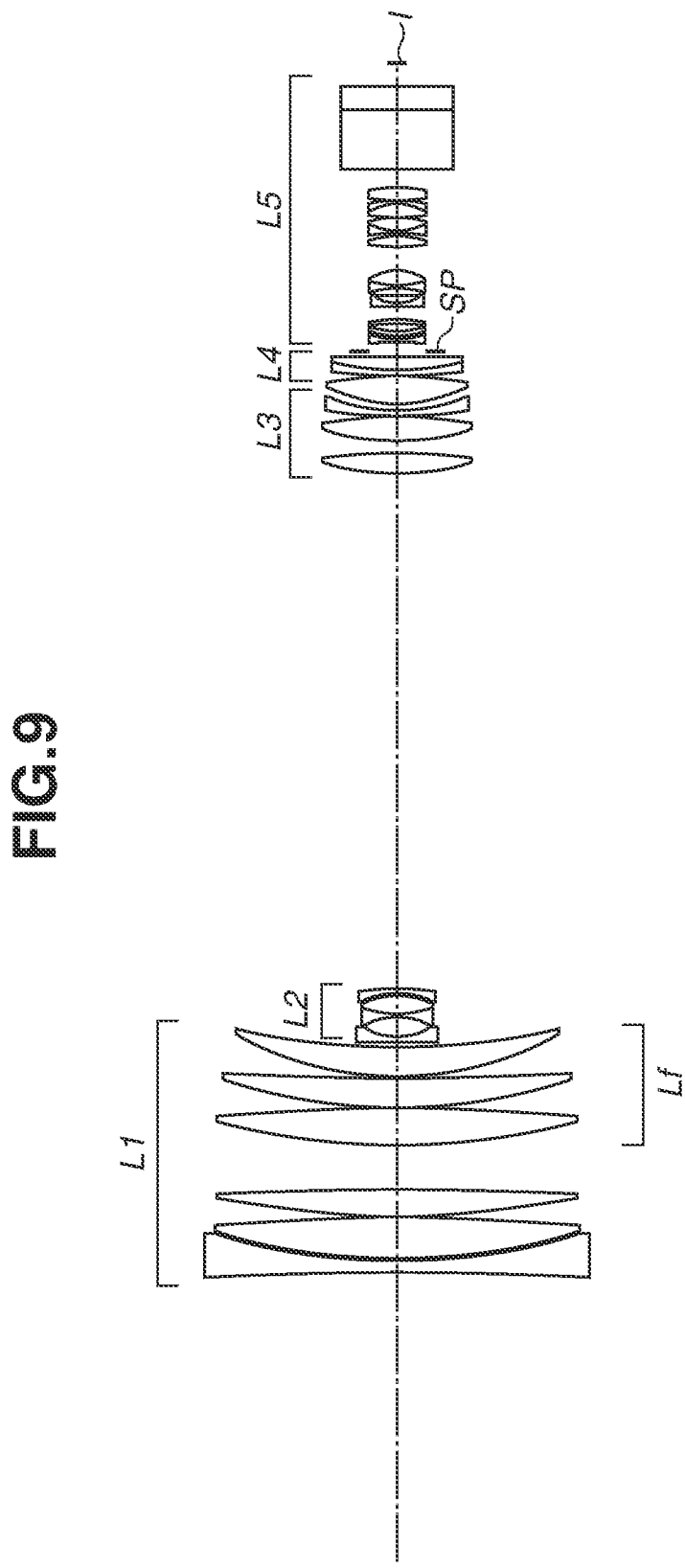
FIG. 9 is a sectional view illustrating a zoom lens according to Example 3.

A zoom lens (optical system) of a lens apparatus according to Example 3 will be described below. FIG. 9 is a sectional view illustrating the zoom lens according to Example 3 at infinity focus and at the wide-angle end. The zoom lens includes lens groups L1 to L5, in this order from the object side toward the image side. The zoom lens includes the aperture stop SP disposed closer to the image plane than the lens group L4 is to the image plane. On an image plane I, the imaging surface of the image sensor that captures (images) an image formed by the zoom lens is disposed. Glass blocks, such as, but not limited to, a color splitting prism and a filter, are provided between the zoom lens and the image plane I.

In FIG. 9, the first lens group consists of the lens group L1. The first lens group L1 includes the sub-lens group Lf which is moved for focusing. The sub-lens group Lf includes three lenses each having positive refractive power. The plurality of movable lens groups consists of the lens groups L2 to L4, in this order from the object side toward the image side. The lens group L2 has negative refractive power and is moved toward the image plane for zooming from the wide-angle end to the telephoto end. The lens group L2 is a principal lens group that handles zooming. The lens group L3 has positive refractive power and is moved toward the object side for zooming from the wide-angle end to the telephoto end.

The lens group L4 has positive refractive power and is moved to reduce an image plane movement in zooming from the wide-angle end to the telephoto end. The final lens group consists of the lens group L5. The aperture stop SP does not move with (in conjunction with) zooming.

Figure 10A:
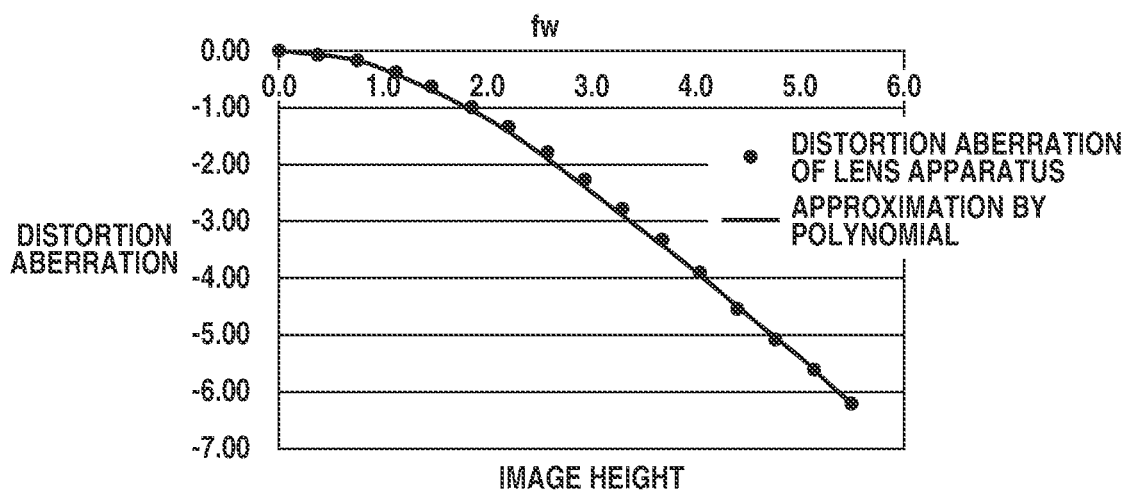
FIGS. 10A to 10C are diagrams illustrating distortion aberrations of the zoom lens according to Example 3 and polynomial approximation.
Figure 10B:
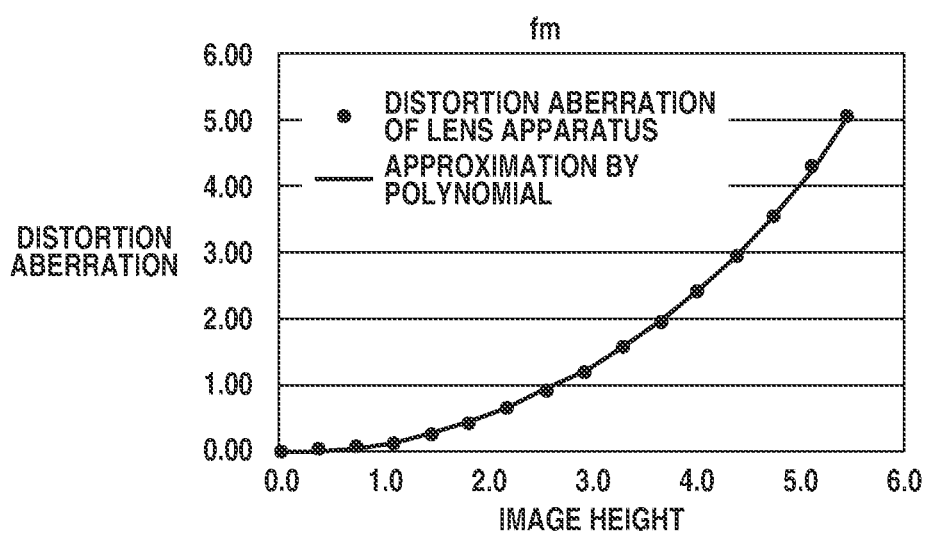
Figure 10C:
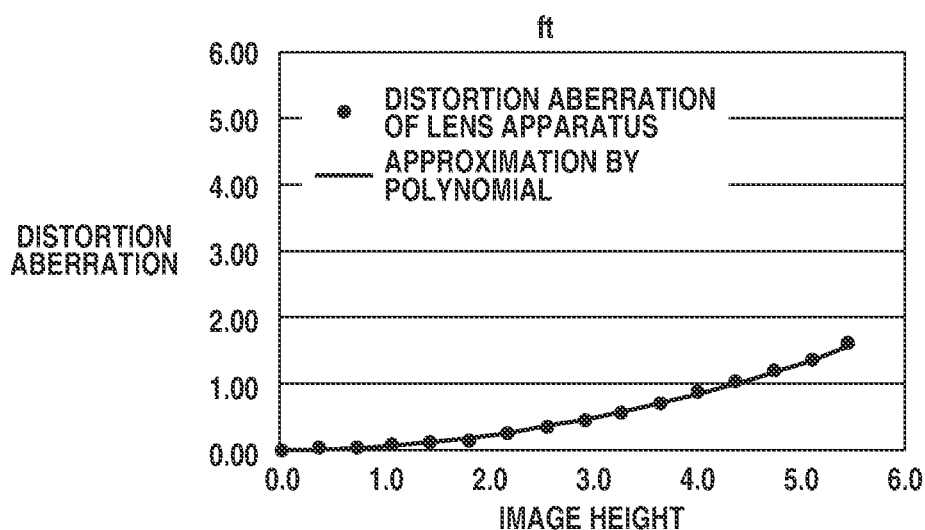
Figure 11A:
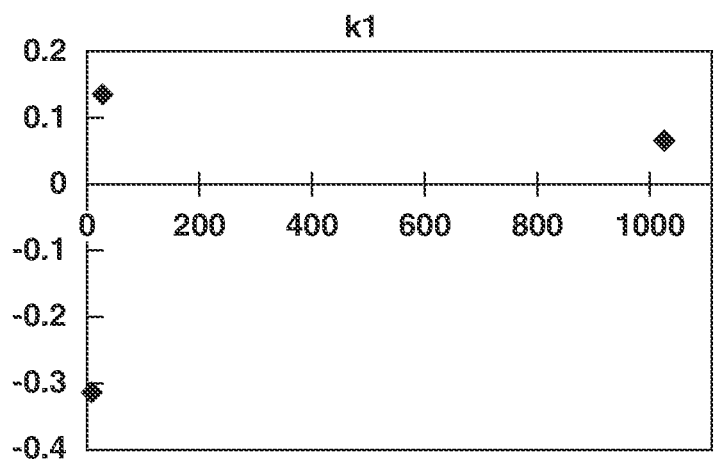
FIGS. 11A to 11C are diagrams illustrating relationships between coefficients of the polynomial and focal lengths according to Example 3.
Figure 11B:
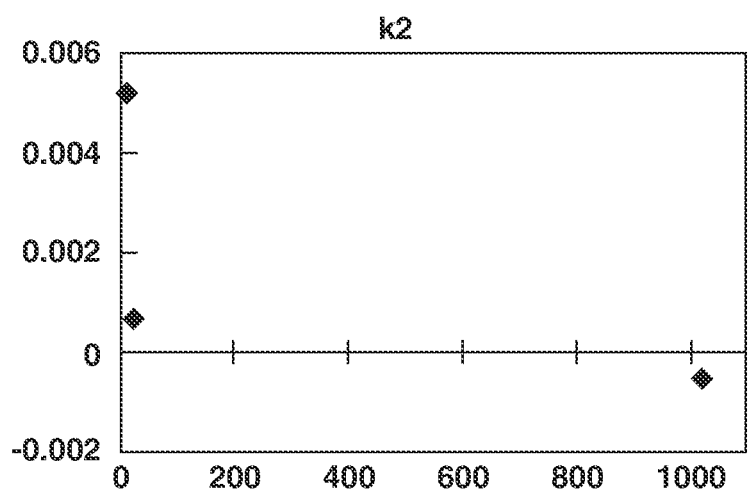
Figure 11C:
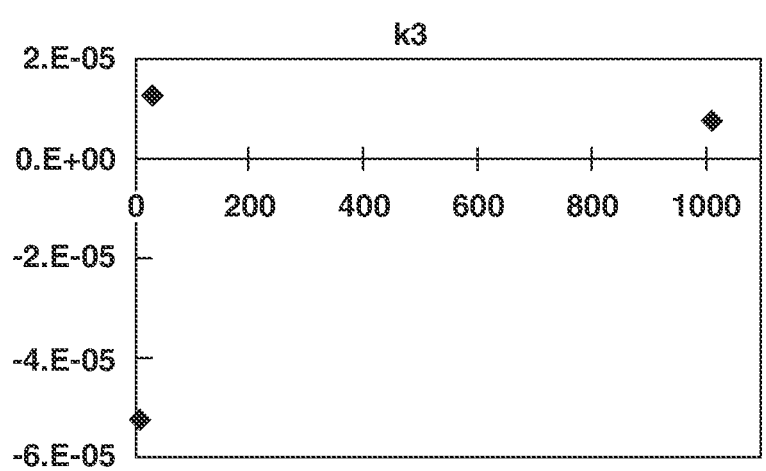

FIGS. 10A to 10C are diagrams illustrating distortion aberrations of the zoom lens according to Example 3 and polynomial approximation. In FIGS. 10A to 10C, points represent distortion aberrations of the zoom lens according to Example 3, and solid lines represent correction amounts expressed (approximated) by the polynomial (1). Values of the coefficients of the polynomial (1) are presented in Table 1, and values of the conditional inequalities are presented in Table 2. Relationships between the coefficients $k_1$, $k_2$, and $k_3$ of the polynomial and the focal lengths are illustrated in FIGS. 11A to 11C.

Example 3 satisfies all of the conditional inequalities (3) to (11), and distortion aberrations (correction amounts) are expressed accurately from the central image height (image height 0 mm) to the maximum image height (image height 5.5 mm) at every focal length (fw, fm, ft), as illustrated in FIGS. 10A to 10C.

Example 4

Figure 12:
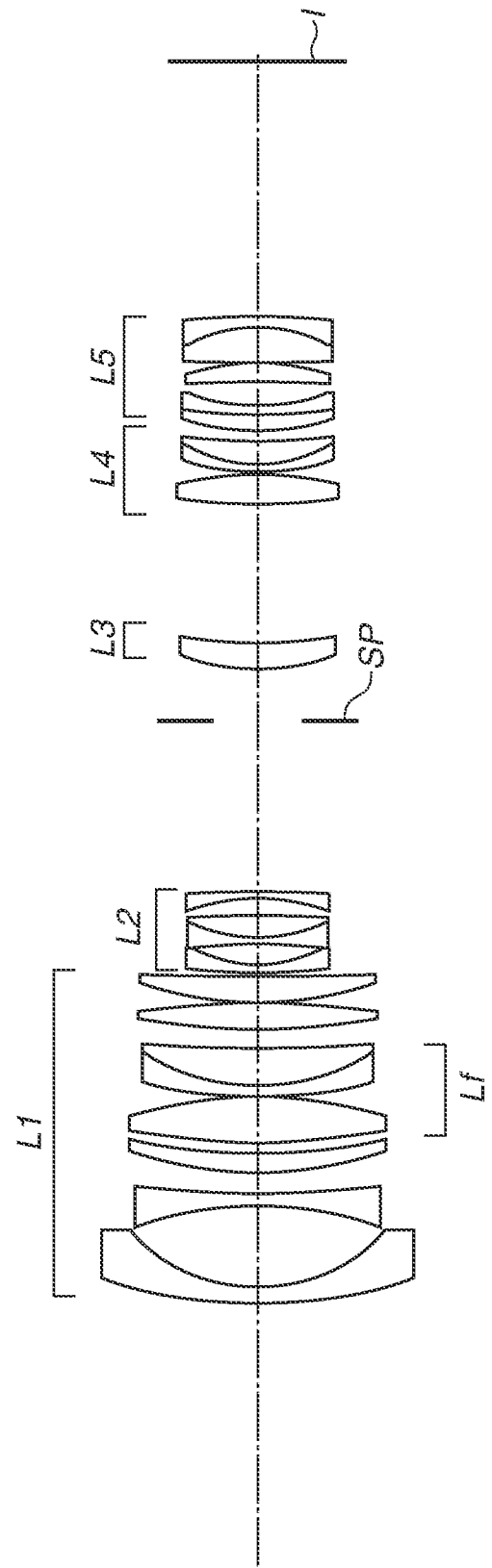
FIG. 12 is a sectional view illustrating a zoom lens according to Example 4.

A zoom lens (optical system) of a lens apparatus according to Example 4 will be described below. FIG. 12 is a sectional view illustrating the zoom lens according to Example 4 at infinity focus and at the wide-angle end. The zoom lens includes the lens groups L1 to L5, in this order from the object side toward the image side. The zoom lens includes the aperture stop SP between the lens groups L2 and L3. On an image plane I, the imaging surface of the image sensor that captures (images) an image formed by the zoom lens is disposed.

In FIG. 12, the first lens group consists of the lens group L1. The first lens group L1 includes the sub-lens group Lf which is moved for focusing. The sub-lens group Lf includes a single lens having positive refractive power and a single cemented lens. The plurality of movable lens groups consists of the lens groups L2 to L4, in this order from the object side toward the image side. The lens group L2 has negative refractive power and is moved toward the image plane for zooming from the wide-angle end to the telephoto end. The lens group L2 is a principal lens group that handles zooming. The lens group L3 has positive refractive power and is moved toward the object for zooming from the wide-angle end to the telephoto end. The lens group L4 has positive refractive power and is moved to reduce movement of an image plane in zooming from the wide-angle end to the telephoto end. The final lens group consists of the lens group L5. The aperture stop SP does not move with (in conjunction with) zooming. An aperture diameter of the aperture stop SP is changeable to reduce change in F-number in zooming.

Figure 13A:
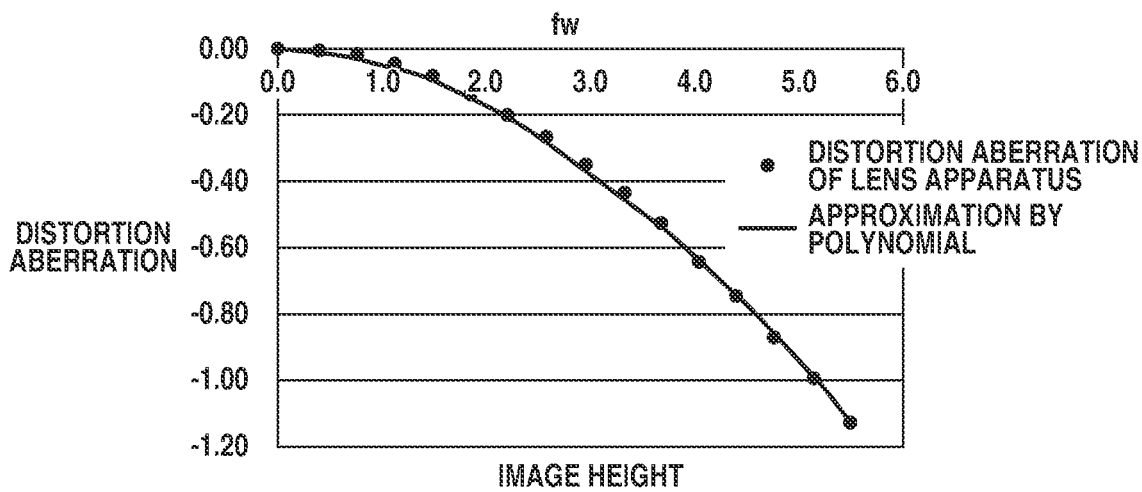
FIGS. 13A to 13C are diagrams illustrating distortion aberrations of the zoom lens according to Example 4 and polynomial approximation.
Figure 13B:
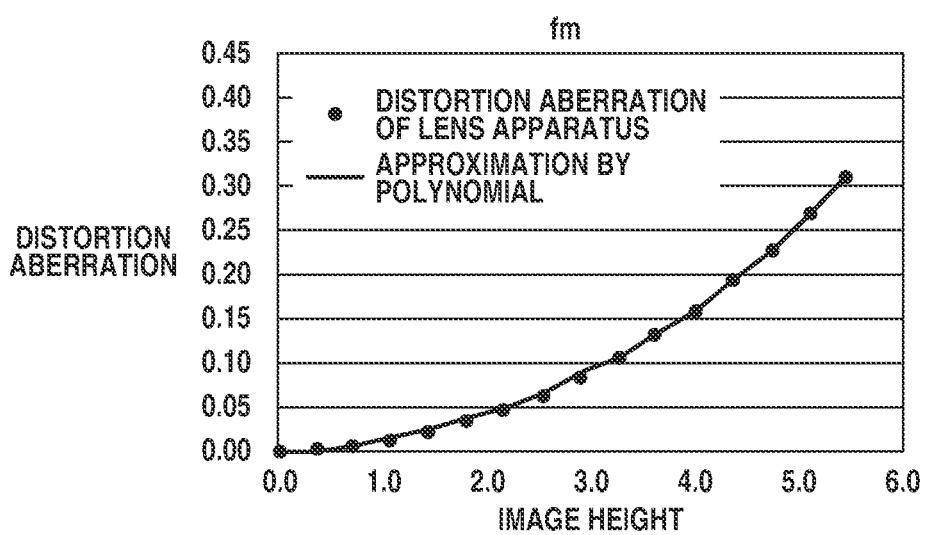
Figure 13C:
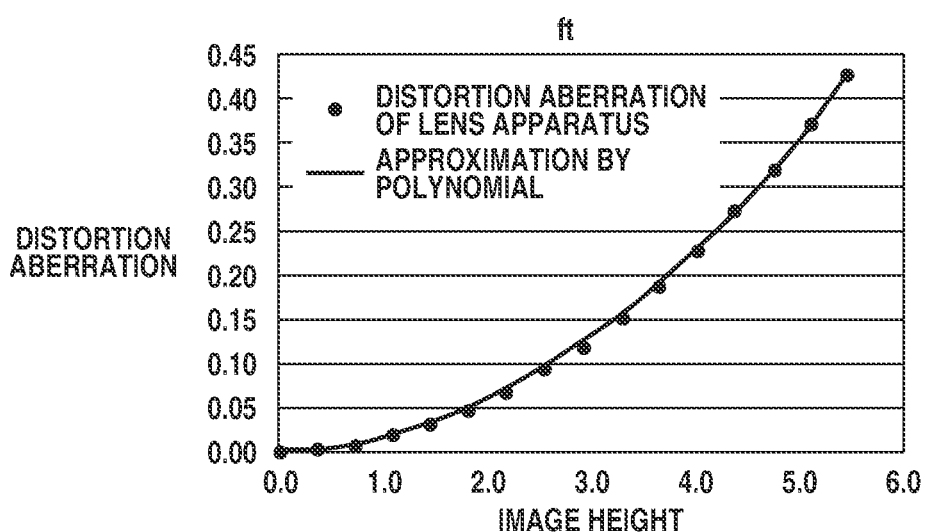
Figure 14A:
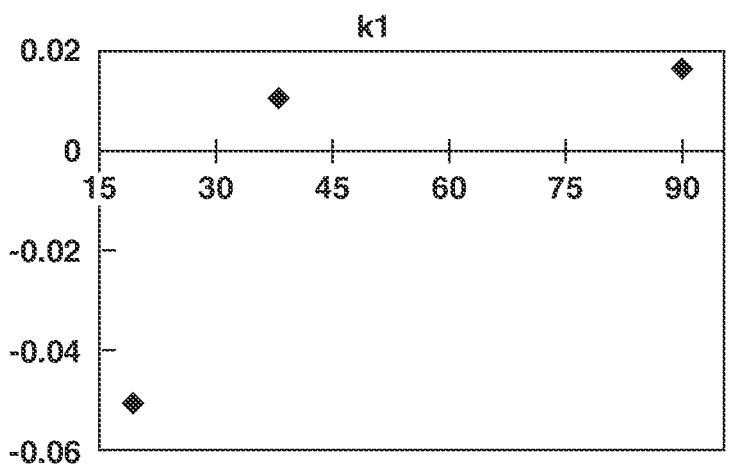
FIGS. 14A to 14C are diagrams illustrating relationships between coefficients of the polynomial and focal lengths.
Figure 14B:
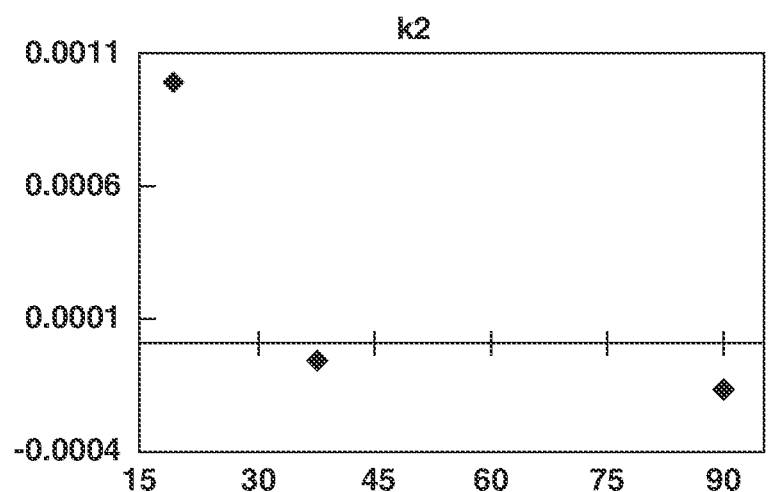
Figure 14C:
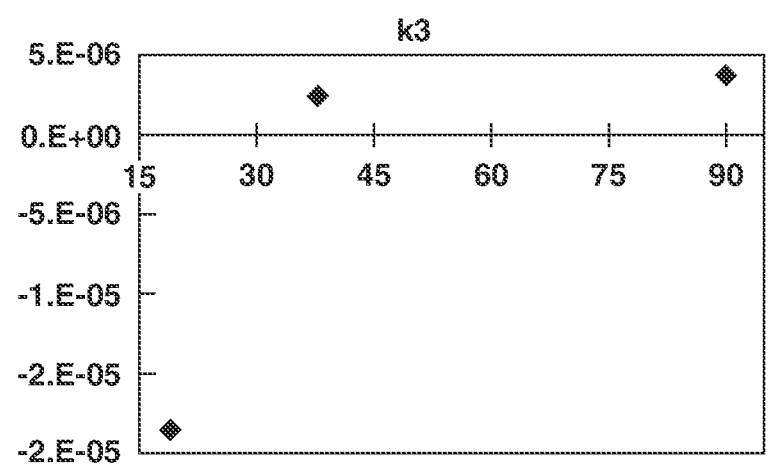

FIGS. 13A to 13C are diagrams illustrating distortion aberrations of the zoom lens according to Example 4 and polynomial approximation. In FIGS. 13A to 13C, points represent distortion aberrations of the zoom lens according to Example 4, and solid lines represent correction amounts expressed (approximated) by the polynomial (1). According to Example 4, fm'=ft. Values of the coefficients of the polynomial (1) are presented in Table 1, and values of the conditional inequalities are presented in Table 2. Relationships between the coefficients $k_1$, $k_2$, and $k_3$ of the polynomial and the focal lengths are illustrated in FIGS. 14A to 14C.

Example 4 satisfies all of the conditional inequalities (3) to (11), and distortion aberrations (correction amounts) are expressed accurately from the central image height (image height 0 mm) to the maximum image height (image height 15.55 mm) at every focal length (fw, fm, ft), as illustrated in FIGS. 13A to 13C.

Numerical embodiments will be described below. Details of numerical values according to the numerical embodiments are as described below. In the numerical embodiments, r represents a radius of curvature of a surface, d represents a distance between surfaces, nd or Nd represents an absolute refractive index at one atmosphere with respect to the Fraunhofer d-line, and vd represents an Abbe number based on the Fraunhofer d-line. Further, a "half angle of view" ω is expressed by an equation, ω=arctan(Y/fw), where 2Y represents a diagonal image size of a camera that uses the corresponding zoom lens, and fw represents a focal length of the zoom lens at the wide-angle end. Further, a "maximum image height" corresponds to the half Y (e.g., 15.55 mm) of the diagonal image size 2Y (e.g., 31.10 mm). BF is a back focus (air equivalent length). The last three surfaces in front of the image plane are surfaces of the glass blocks, such as a filter. The Abbe number vd is as generally defined and is expressed by the following equation:

$$vd=(Nd-1)/(NF-NC),$$

where NF represents a refractive index related to the Fraunhofer F-line, Nd represents a refractive index related to the Fraunhofer d-line, and NC represents a refractive index related to the Fraunhofer C-line.

Aspherical surface shapes are expressed with an X-axis being set along the optical axis direction, an H-axis being set along a direction orthogonal to the optical axis direction, and a light travel direction being positive. Further, R represents a paraxial radius of curvature, k represents a conic constant, and A3 to A16 represent aspherical surface coefficients. Each aspherical surface shape (an amount of deviation from a reference spherical surface) is expressed by the following equation:

$$X = \frac{H^2/R}{1+\sqrt{1-(1+k)(H/R)^2}} + A4H^4 + A6H^6 + \\ A8H^8 + A10H^{10} + A12H^{12} + A14H^{14} + A16H^{16} + A3H^3 + \\ A5H^5 + A7H^7 + A9H^9 + A11H^{11} + A13H^{13} + A15H^{15}.$$

Further, "e-Z" indicates "×10$^{-Z}$". Further, the symbol "*" attached to the right of a surface number indicates that the corresponding surface is an aspherical surface.

A movement amount of a lens group that is moved for zooming in a case where a negative lens group that is moved for zooming and is closest to the object is moved from the wide-angle end to the telephoto end is expressed by the following equation.

$$f_j(y) = \sum_n B_{jn} y^n$$

In the above equation, j represents a number of a lens group that is moved for zooming, the light travel direction is positive, y represents a position of the lens group j in the range of 0 to 1 from the wide-angle end to the telephoto end, fj(y) represents a movement amount of the lens group j from the wide-angle end in the optical axis direction, and Bjn is a coefficient of the polynomial (n is a degree of each term). The lens group that is moved for zooming and is closest to the image plane is moved to compensate for change in the position of the image plane that is associated with zooming.

Numerical Embodiment 1

| | Unit: mm | | | |
|---|---|---|---|---|
| | Surface Data | | | |
| Surface Number | r | d | nd | vd |
| 1* | 1918.222 | 2.50 | 1.83481 | 42.7 |
| 2 | 30.936 | 17.09 | | |
| 3* | 159.855 | 2.00 | 1.83481 | 42.7 |
| 4 | 86.331 | 10.04 | | |
| 5 | −94.827 | 1.80 | 1.83481 | 42.7 |
| 6 | −527.011 | 0.15 | | |
| 7 | 94.270 | 4.26 | 1.92286 | 18.9 |
| 8 | 347.768 | 1.67 | | |
| 9 | 164.790 | 8.26 | 1.60300 | 65.4 |
| 10* | −99.054 | 4.41 | | |
| 11 | −604.301 | 8.00 | 1.43387 | 95.1 |
| 12 | −55.085 | 0.30 | | |
| 13 | −53.196 | 1.70 | 1.80000 | 29.8 |
| 14 | −110.385 | 0.18 | | |
| 15 | 169.977 | 1.70 | 1.91650 | 31.6 |
| 16 | 53.615 | 13.56 | 1.43875 | 94.7 |
| 17 | −122.220 | 0.40 | | |
| 18 | 861.296 | 9.06 | 1.43387 | 95.1 |
| 19 | −67.470 | 0.40 | | |
| 20 | 111.203 | 8.23 | 1.76385 | 48.5 |
| 21 | −166.639 | (variable) | | |
| 22 | 96.566 | 0.70 | 2.00100 | 29.1 |
| 23 | 17.507 | 4.07 | | |
| 24 | −61.457 | 0.70 | 1.43875 | 94.7 |
| 25 | 70.548 | 2.33 | | |
| 26 | −109.228 | 5.39 | 1.85478 | 24.8 |
| 27 | −14.852 | 0.70 | 1.88300 | 40.8 |
| 28 | 171.286 | 0.21 | | |
| 29 | 40.389 | 3.04 | 1.64769 | 33.8 |
| 30 | −122.593 | (variable) | | |
| 31 | −32.417 | 0.80 | 1.72916 | 54.7 |
| 32 | 45.308 | 2.57 | 1.84666 | 23.8 |
| 33 | 1466.077 | (variable) | | |
| 34* | 66.039 | 6.29 | 1.58913 | 61.1 |
| 35 | −54.493 | (variable) | | |
| 36 (aperture stop) | ∞ | 1.84 | | |
| 37 | 122.970 | 5.35 | 1.51742 | 52.4 |
| 38 | −46.108 | 1.00 | 1.83481 | 42.7 |
| 39 | −164.538 | 35.50 | | |
| 40 | 61.903 | 5.47 | 1.63980 | 34.5 |
| 41 | −51.062 | 1.55 | | |
| 42 | −91.972 | 0.90 | 1.88300 | 40.8 |
| 43 | 27.882 | 5.27 | 1.48749 | 70.2 |
| 44 | −141.929 | 0.20 | | |
| 45 | 61.770 | 7.82 | 1.43875 | 94.7 |
| 46 | −21.051 | 0.90 | 2.00100 | 29.1 |
| 47 | −54.423 | 0.13 | | |
| 48 | 141.825 | 5.35 | 1.48749 | 70.2 |
| 49 | −31.912 | 4.00 | | |
| 50 | ∞ | 33.00 | 1.60859 | 46.4 |
| 51 | ∞ | 13.20 | 1.51680 | 64.2 |
| 52 | ∞ | 7.45 | | |
| Image Plane | ∞ | | | |

Aspherical Surface Data

First Surface

| K = 0.00000e+00 | A4 = 3.89922e−06 | A6 = 1.07694e−08 | A8 = 7.79026e−12 |
|---|---|---|---|
| A10 = 9.49367e−14 | A12 = 1.11174e−16 | A14 = 1.85192e−20 | A16 = −6.14971e−26 |
| A3 = 1.60188e−05 | A5 = −1.68458e−07 | A7 = −3.06230e−10 | A9 = −1.17457e−12 |
| A11 = −4.11466e−15 | A13 = −1.90016e−18 | A15 = −7.32479e−23 | |

Third Surface

| K = 0.00000e+00 | A4 = −2.18327e−06 | A6 = −7.46601e−08 | A8 = −7.11385e−10 |
|---|---|---|---|
| A10 = −3.23420e−13 | A12 = 1.59786e−15 | A14 = −6.51605e−19 | A16 = −2.04040e−22 |
| A3 = −1.28010e−05 | A5 = 4.37046e−07 | A7 = 9.13598e−09 | A9 = 3.03267e−11 |
| A11 = −3.27268e−14 | A13 = −1.78219e−17 | A15 = 2.23023e−20 | |

Tenth Surface

| K = 0.00000e+00 | A4 = 1.08070e−06 | A6 = 1.37549e−08 | A8 = 2.71473e−10 |
|---|---|---|---|
| A10 = 2.08368e−13 | A12 = −7.68841e−16 | A14 = 1.05285e−18 | A16 = 2.18705e−22 |

-continued

Unit: mm

| | | | |
|---|---|---|---|
| A3 = −3.60136e−06 | A5 = −1.77292e−08 | A7 = −2.66936e−09 | A9 = −1.44188e−11 |
| A11 = 1.68104e−14 | A13 = −4.82004e−18 | A15 = −2.64010e−20 | |

Thirty-fourth Surface

| | | | |
|---|---|---|---|
| K = −1.32879e+01 | A4 = 1.73777e−06 | A6 = −4.65336e−09 | A8 = 2.82343e−12 |

Zoom Movement Amount Data (Bjn)

B21 = 52.06088
B31 = −11.59606
B32 = −4.95021
B33 = 32.12963

Movement Amount of Sub-Lens Group for Focusing (Movement Amount is Positive in a Case where Sub-Lens Group Moves from Object Side Toward Image Side)

| Group | Infinity | Closest (−0.3 m from lens surface closest to object) |
|---|---|---|
| 1 Group | 0 | 3.208 |

Various Data
Zoom Ratio 13.60

| | Wide-angle | fm | Telephoto |
|---|---|---|---|
| Focal Length | 4.43 | 13.37 | 60.25 |
| F-number | 1.86 | 1.86 | 2.78 |
| Half Angle of View | 51.15 | 22.35 | 5.22 |
| Image Height | 5.50 | 5.50 | 5.50 |
| Total Lens Length | 315.65 | 315.65 | 315.65 |
| BF | 7.45 | 7.45 | 7.45 |

-continued

| | | | |
|---|---|---|---|
| d21 | 0.65 | 32.75 | 52.71 |
| d30 | 40.88 | 7.27 | 4.40 |
| d33 | 14.36 | 17.96 | 2.11 |
| d35 | 8.35 | 6.25 | 5.02 |
| d52 | 7.45 | 7.45 | 7.45 |

Zoom Lens Group Data

| Group | Starting Surface | Focal Length |
|---|---|---|
| 1 | 1 | 29.69 |
| 2 | 22 | −20.23 |
| 3 | 31 | −48.88 |
| 4 | 34 | 51.48 |
| 5 | 36 | 53.03 |

Numerical Embodiment 2

Unit: mm

Surface Data

| Surface Number | r | d | nd | vd |
|---|---|---|---|---|
| 1 | 824.902 | 3.00 | 1.80610 | 40.9 |
| 2 | 158.319 | 1.21 | | |
| 3 | 162.063 | 14.06 | 1.43387 | 95.1 |
| 4 | −466.625 | 10.91 | | |
| 5 | 168.657 | 9.04 | 1.43387 | 95.1 |
| 6 | 820.944 | 0.20 | | |
| 7 | 148.539 | 12.09 | 1.43387 | 95.1 |
| 8 | −5912.120 | 0.20 | | |
| 9 | 123.587 | 6.47 | 1.43387 | 95.1 |
| 10 | 216.650 | (variable) | | |
| 11 | 86.066 | 1.00 | 1.85150 | 40.8 |
| 12 | 24.362 | 7.51 | | |
| 13 | −48.305 | 0.90 | 1.81600 | 46.6 |
| 14 | 71.499 | 0.70 | | |
| 15 | 49.278 | 6.33 | 1.80810 | 22.8 |
| 16 | −55.053 | (variable) | | |
| 17 | −37.373 | 1.10 | 1.81600 | 46.6 |
| 18* | −188.072 | (variable) | | |
| 19 | −54.569 | 1.30 | 1.77250 | 49.6 |
| 20 | 76.386 | 3.58 | 1.84666 | 23.8 |
| 21 | −2973.776 | (variable) | | |
| 22 (aperture stop) | ∞ | 1.00 | | |
| 23 | 161.111 | 6.57 | 1.60738 | 56.8 |
| 24 | −69.560 | 0.15 | | |
| 25 | 324.619 | 4.43 | 1.51823 | 58.9 |
| 26 | −111.651 | 0.35 | | |
| 27 | 51.937 | 8.26 | 1.48749 | 70.2 |
| 28 | −74.253 | 1.50 | 1.83400 | 37.2 |
| 29 | 455.597 | 0.15 | | |
| 30 | 31.698 | 7.46 | 1.48749 | 70.2 |
| 31 | 929.268 | 1.50 | 1.88300 | 40.8 |
| 32 | 31.618 | 50.00 | | |

-continued

| | | Unit: mm | | |
|---|---|---|---|---|
| 33 | 73.343 | 5.68 | 1.57501 | 41.5 |
| 34 | −56.462 | 0.20 | | |
| 35 | 194.336 | 1.20 | 1.81600 | 46.6 |
| 36 | 68.964 | 3.34 | 1.51742 | 52.4 |
| 37 | 1844.233 | 0.20 | | |
| 38 | 30.899 | 6.42 | 1.49700 | 81.5 |
| 39 | −57.977 | 1.20 | 1.88300 | 40.8 |
| 40 | 36.665 | 2.00 | | |
| 41 | 81.340 | 3.37 | 1.51823 | 58.9 |
| 42 | −221.688 | 3.80 | | |
| 43 | ∞ | 33.00 | 1.60859 | 46.4 |
| 44 | ∞ | 13.20 | 1.51680 | 64.2 |
| 45 | ∞ | 8.90 | | |
| Image Plane | ∞ | | | |

Aspherical Surface Data

Eighteenth Surface

K = 6.06641e+01　A4 = 1.21406e−06　A6 = 1.81961e−09　A8 = 1.60180e−12

Zoom Movement Amount Data (Bjn)

B21 = 121.42344
B31 = 99.93579
B32 = 237.56905
B33 = −873.72450
B34 = 1520.60328
B35 = −1306.91156
B36 = 509.20192
B37 = −45.03192
B38 = −20.36269

Movement Amount of Sub-Lens Group for Focusing (Movement Amount is Positive in a Case where Sub-Lens Group Moves from Object Side Toward Image Side)

| Group | Infinity | Closest (−0.3 m from lens surface closest to object) |
|---|---|---|
| 1 Group | 0 | −10.018 |

Various Data
Zoom Ratio 40.00

| | Wide-angle | fm | Telephoto |
|---|---|---|---|
| Focal Length | 11.00 | 26.08 | 440.00 |
| F-number | 2.10 | 2.10 | 4.10 |
| Half Angle of View | 26.57 | 11.91 | 0.72 |
| Image Height | 5.50 | 5.50 | 5.50 |
| Total Lens Length | 389.79 | 389.79 | 389.79 |
| BF | 8.90 | 8.90 | 8.90 |

-continued

| | | | |
|---|---|---|---|
| d10 | 0.48 | 55.12 | 121.91 |
| d16 | 3.16 | 4.25 | 3.02 |
| d18 | 129.16 | 65.46 | 19.61 |
| d21 | 13.52 | 21.50 | 1.79 |
| d45 | 8.90 | 8.90 | 8.90 |

Zoom Lens Group Data

| Group | Starting Surface | Focal Length |
|---|---|---|
| 1 | 1 | 161.84 |
| 2 | 11 | −56.13 |
| 3 | 17 | −57.06 |
| 4 | 19 | −77.62 |
| 5 | 22 | 69.73 |

Numerical Embodiment 3

| | Unit: mm | | | |
|---|---|---|---|---|
| | Surface Data | | | |
| Surface Number | r | d | nd | vd |
| 1 | −2942.188 | 6.00 | 1.83481 | 42.7 |
| 2 | 335.459 | 1.80 | | |
| 3 | 335.066 | 23.71 | 1.43387 | 95.1 |
| 4 | −1057.929 | 0.20 | | |
| 5 | 525.299 | 14.68 | 1.43387 | 95.1 |
| 6 | −2449.905 | 25.25 | | |
| 7 | 377.042 | 20.53 | 1.43387 | 95.1 |
| 8 | −1365.497 | 0.25 | | |
| 9 | 306.954 | 16.16 | 1.43387 | 95.1 |
| 10 | 1716.232 | 1.50 | | |
| 11 | 188.244 | 16.19 | 1.43875 | 94.7 |
| 12 | 408.078 | (variable) | | |

-continued

| | | Unit: mm | | |
|---|---|---|---|---|
| 13* | −532.824 | 2.20 | 2.00330 | 28.3 |
| 14 | 38.132 | 11.72 | | |
| 15 | −44.546 | 1.45 | 1.74320 | 49.3 |
| 16 | 72.565 | 9.77 | 1.89286 | 20.4 |
| 17 | −46.484 | 1.63 | | |
| 18 | −41.758 | 2.00 | 1.88300 | 40.8 |
| 19 | −152.608 | (variable) | | |
| 20 | 152.336 | 11.49 | 1.72916 | 54.7 |
| 21* | −265.715 | 6.62 | | |
| 22 | 139.888 | 13.50 | 1.43875 | 94.7 |
| 23 | −246.304 | 0.50 | | |
| 24 | 264.094 | 2.60 | 1.85478 | 24.8 |
| 25 | 97.106 | (variable) | | |
| 26 | 86.506 | 15.39 | 1.49700 | 81.5 |
| 27 | −236.969 | 0.50 | | |
| 28 | 415.877 | 2.50 | 1.80518 | 25.4 |
| 29 | 139.362 | 7.85 | 1.60311 | 60.6 |
| 30* | −764.201 | (variable) | | |
| 31 (aperture stop) | ∞ | 5.46 | | |
| 32 | −100.588 | 1.40 | 1.88300 | 40.8 |
| 33 | 50.285 | 1.36 | | |
| 34 | 40.817 | 3.60 | 1.92286 | 18.9 |
| 35 | 96.042 | 4.19 | | |
| 36 | −79.866 | 1.70 | 1.80400 | 46.5 |
| 37 | −114.439 | 7.69 | | |
| 38 | 447.233 | 1.50 | 1.80400 | 46.5 |
| 39 | 36.261 | 4.29 | 1.84666 | 23.9 |
| 40 | 154.673 | 4.71 | | |
| 41 | −40.896 | 1.50 | 1.89190 | 37.1 |
| 42 | 100.531 | 8.12 | 1.51633 | 64.1 |
| 43 | −29.819 | 12.96 | | |
| 44 | 95.109 | 5.83 | 1.51742 | 52.4 |
| 45 | −65.823 | 1.40 | | |
| 46 | −142.700 | 1.50 | 1.88300 | 40.8 |
| 47 | 37.951 | 7.64 | 1.48749 | 70.2 |
| 48 | −86.098 | 0.20 | | |
| 49 | 111.798 | 7.63 | 1.51742 | 52.4 |
| 50 | −35.378 | 1.50 | 1.88300 | 40.8 |
| 51 | −107.947 | 0.20 | | |
| 52 | 90.094 | 7.67 | 1.53996 | 59.5 |
| 53 | −53.741 | 10.00 | | |
| 54 | ∞ | 33.00 | 1.60859 | 46.4 |
| 55 | ∞ | 13.20 | 1.51633 | 64.2 |
| 56 | ∞ | 13.30 | | |
| Image Plane | ∞ | | | |

Aspherical Surface Data

Thirteenth Surface

| | | | |
|---|---|---|---|
| K = 1.99852e+00 | A4 = 1.15677e−06 | A6 = −2.75064e−08 | A8 = −3.06848e−10 |
| A10 = 9.10515e−13 | A12 = 3.28486e−15 | A14 = 1.35261e−18 | A16 = 5.54400e−22 |
| A3 = 2.74335e−07 | A5 = 9.95673e−08 | A7 = 4.02226e−09 | A9 = 6.12079e−12 |
| A11 = −8.52506e−14 | A13 = −6.85632e−17 | A15 = −3.84859e−20 | |

Twenty-first Surface

| | | | |
|---|---|---|---|
| K = 1.21093e+01 | A4 = 2.82183e−07 | A6 = −5.59441e−11 | A8 = −2.00796e−14 |
| A10 = 9.78964e−17 | A12 = −6.30815e−20 | A14 = 1.70834e−23 | A16 = −4.73901e−27 |
| A3 = −2.90901e−08 | A5 = 1.58196e−09 | A7 = 1.10620e−12 | A9 = −1.50730e−15 |
| A11 = 5.86871e−20 | A13 = 1.04584e−22 | A15 = 1.44467e−25 | |

Thirtieth Surface

| | | | |
|---|---|---|---|
| K = −2.23400e+02 | A4 = 2.77687e−07 | A6 = 4.69555e−10 | A8 = 1.39733e−13 |
| A10 = −2.98156e−16 | A12 = 4.58582e−19 | A14 = −2.25443e−22 | A16 = 5.80568e−26 |
| A3 = 1.70768e−07 | A5 = −5.73181e−09 | A7 = −1.36230e−11 | A9 = 7.92918e−15 |
| A11 = −8.14405e−18 | A13 = 2.06016e−21 | A15 = −8.57551e−25 | |

Zoom Movement Amount Data (Bjn)

B21 = 190.61210
B31 = −81.42639
B32 = −469.63975
B33 = 13687.70512
B34 = −140068.98908
B35 = 760880.35283
B36 = −2376002.70410
B37 = 4211134.26218

-continued

Unit: mm

B38 = −3789723.47932
B39 = 1545916.15743
B310 = −2597703.98105
B311 = 6246760.10033
B312 = −4791762.76575
B313 = 950677.92784
B314 = −3352180.08094
B315 = 6728667.70384
B316 = −4037899.79534
B317 = 396574.90335
B318 = 231497.03326

Movement Amount of Sub-Lens Group for Focusing (Movement Amount is Positive in a Case where Sub-Lens Group Moves from Object Side Toward Image Side)

| Group | Infinity | Closest (−0.3 m from lens surface closest to object) |
|---|---|---|
| 1 Group | 0 | −23.276 |

Various Data
Zoom Ratio 120.00

| | Wide-angle | fm | Telephoto |
|---|---|---|---|
| Focal Length | 8.50 | 25.71 | 1020.00 |
| F-number | 1.75 | 1.75 | 5.30 |
| Half Angle of View | 32.91 | 12.08 | 0.31 |
| Image Height | 5.50 | 5.50 | 5.50 |
| Total Lens Length | 677.55 | 677.55 | 677.55 |
| BF | 13.30 | 13.30 | 13.30 |

-continued

| | | | |
|---|---|---|---|
| d12 | 3.47 | 89.25 | 194.08 |
| d19 | 289.33 | 175.46 | 2.00 |
| d25 | 4.21 | 21.26 | 4.50 |
| d30 | 2.99 | 14.04 | 99.42 |
| d56 | 13.30 | 13.30 | 13.30 |

Zoom Lens Group Data

| Group | Starting Surface | Focal Length |
|---|---|---|
| 1 | 1 | 251.50 |
| 2 | 13 | −24.07 |
| 3 | 20 | 134.62 |
| 4 | 26 | 112.37 |
| 5 | 31 | 42.11 |

Numerical Embodiment 4

Unit: mm

Surface Data

| Surface Number | r | d | nd | vd |
|---|---|---|---|---|
| 1* | 104.521 | 2.70 | 1.77250 | 49.6 |
| 2 | 30.315 | 14.58 | | |
| 3 | −63.571 | 1.98 | 1.77250 | 49.6 |
| 4 | 199.025 | 3.89 | | |
| 5 | 74.494 | 3.29 | 1.89286 | 20.4 |
| 6 | 115.023 | 2.02 | | |
| 7 | 116.955 | 7.83 | 1.62041 | 60.3 |
| 8 | −78.664 | 0.20 | | |
| 9 | 81.511 | 1.89 | 1.85478 | 24.8 |
| 10 | 36.329 | 6.64 | 1.49700 | 81.5 |
| 11 | 331.011 | 3.24 | | |
| 12 | 115.367 | 4.63 | 1.59522 | 67.7 |
| 13 | −164.145 | 0.18 | | |
| 14 | 63.769 | 4.60 | 1.76385 | 48.5 |
| 15 | 875.792 | (variable) | | |
| 16* | 184.662 | 1.26 | 1.88300 | 40.8 |
| 17 | 25.638 | 3.57 | | |
| 18 | −158.203 | 1.08 | 1.59522 | 67.7 |
| 19 | 28.243 | 3.98 | 1.85478 | 24.8 |
| 20 | −926.470 | 3.00 | | |
| 21 | −40.093 | 1.08 | 1.76385 | 48.5 |
| 22 | −458.726 | (variable) | | |
| 23 (aperture stop) | ∞ | (variable) | | |
| 24 | 37.250 | 4.66 | 1.59522 | 67.7 |
| 25* | 133.331 | (variable) | | |
| 26 | 118.893 | 5.48 | 1.49700 | 81.5 |
| 27 | −53.600 | 0.18 | | |
| 28 | 40.924 | 1.49 | 2.00100 | 29.1 |
| 29 | 26.603 | 4.13 | 1.49700 | 81.5 |
| 30 | 116.235 | (variable) | | |
| 31 | 40.142 | 2.87 | 1.95906 | 17.5 |
| 32 | 95.191 | 1.49 | 2.00069 | 25.5 |
| 33 | 33.561 | 4.20 | | |

-continued

Unit: mm

| | | | | |
|---|---|---|---|---|
| 34 | −770.312 | 3.44 | 1.48749 | 70.2 |
| 35 | −41.561 | 0.18 | | |
| 36 | 395.833 | 6.22 | 1.49700 | 81.5 |
| 37 | −24.801 | 1.68 | 1.95375 | 32.3 |
| 38 | −124.306 | 45.29 | | |
| Image Plane | ∞ | | | |

Aspherical Surface Data

First Surface

K = 6.63182e+00   A4 = 8.41422e−08   A6 = 4.05320e−11   A8 = −6.76543e−13

Sixteenth Surface

K = 0.00000e+00   A4 = 2.77839e−07   A6 = −1.12528e−09   A8 = −1.24698e−12

Twenty-fifth Surface

K = 0.00000e+00   A4 = 6.24439e−06   A6 = 6.92935e−10   A8 = 1.01985e−12

Zoom Movement Amount Data (Bjn)

B21 = 28.72949
B41 = −0.79125
B42 = 21.08072
B43 = 17.59575
B44 = −93.79500
B45 = 62.48478
B46 = −14.01060

Movement Amount of Sub-Lens Group for Focusing (Movement Amount is Positive in a Case where Sub-Lens Group Moves from Object Side Toward Image Side)

| Group | Infinity | Closest (−0.3 m from lens surface closest to object) |
|---|---|---|
| 1 Group | 0 | 2.176 |

Various Data
Zoom Ratio 4.74

| | Wide-angle | fm | Telephoto |
|---|---|---|---|
| Focal Length | 19.00 | 37.88 | 90.00 |
| F-number | 4.00 | 4.00 | 4.00 |
| Half Angle of View | 39.30 | 22.32 | 9.80 |
| Image Height | 15.55 | 15.55 | 15.55 |
| Total Lens Length | 219.66 | 219.66 | 219.66 |
| BF | 45.29 | 45.29 | 45.29 |

-continued

| | | | |
|---|---|---|---|
| d15 | 0.96 | 19.15 | 29.68 |
| d22 | 30.43 | 12.24 | 1.70 |
| d23 | 9.15 | 11.95 | 1.71 |
| d25 | 24.43 | 13.27 | 2.02 |
| d30 | 1.76 | 10.13 | 31.60 |
| d38 | 45.29 | 45.29 | 45.29 |

Zoom Lens Group Data

| Group | Starting Surface | Focal Length |
|---|---|---|
| 1 | 1 | 45.00 |
| 2 | 16 | −22.80 |
| 3 | 24 | 85.00 |
| 4 | 26 | 65.00 |
| 5 | 31 | −502.40 |

TABLE 1

| | Example | | | | | |
|---|---|---|---|---|---|---|
| | 1 | | | 2 | | |
| | Focal Length | | | | | |
| | fw | fm | ft | fw | fm | ft |
| | 4.4301 | 13.374 | 60.2483 | 11 | 26.0794 | 439.9999 |
| $k_1$ | −0.70906 | 0.165705 | 0.084166 | −0.18273 | 0.105584 | 0.037786 |
| $k_2$ | 0.033186 | 0.000107 | 7.07E−05 | 0.003579 | 9.30E−05 | −0.00029 |
| $k_3$ | −0.00054 | 1.30E−05 | −2.80E−06 | −5.20E−05 | 1.73E−05 | 6.79E−06 |

TABLE 1-continued

| | | | Example | | | |
|---|---|---|---|---|---|---|
| | | 3 | | | 4 | |
| | | | Focal Length | | | |
| | fw | fm | ft | fw | fm | ft |
| | 8.5 | 25.7083 | 1019.996 | 19 | 37.8786 | 89.9998 |
| $k_1$ | −0.31323 | 0.135826 | 0.066176 | −0.05049 | 0.010207 | 0.015621 |
| $k_2$ | 0.005207 | 0.000672 | −0.00055 | 0.000987 | −6.80E−05 | −0.00016 |
| $k_3$ | −5.20E−05 | 1.32E−05 | 8.20E−06 | −1.80E−05 | 2.33E−06 | 3.73E−06 |

TABLE 2

| Conditional Expression | | Example | | | |
|---|---|---|---|---|---|
| | | 1 | 2 | 3 | 4 |
| 2 | $|A_t|/A_w$ | 0.01779 | 0.01053 | 0.00294 | 0.032308 |
| 3 | fm | 13.374 | 26.0794 | 25.7083 | 37.8786 |
| | fm1 | 6.553046 | 19.129414 | 17.429938 | 23.992571 |
| | fm2 | 16.337258 | 69.570101 | 93.112643 | 41.3521 |
| 4 | $k_{1t}/k_{1w}$ | −0.1187 | −0.20679 | −0.21127 | −0.30939 |
| 5 | $|B_t/Bw|$ | 0.000208 | 0.004033 | 0.004659 | 0.032923 |
| 6 | $k_2/k_{2w}$ | 0.002132 | −0.08183 | −0.10537 | −0.16584 |
| 7-1 | $k_{2w}/k_{1w}$ | −0.0468 | −0.01959 | −0.01662 | −0.01954 |
| 7-2 | $k_{2t}/k_{1t}$ | 0.00084 | −0.00775 | −0.00829 | −0.01048 |
| 8 | $|C_t/Cw|$ | 0.00543 | 0.00556 | 0.00133 | 0.02442 |
| 9 | $k_3/k_{3w}$ | 0.005159 | −0.1313 | −0.15847 | −0.20179 |
| 10 | $A_t/A_w$ | −0.01779 | −0.01053 | −0.00294 | 0.032308 |
| 11 | fm' | 13.374 | 26.079 | 25.708 | 89.9998 |
| | fm1' | 7.4665 | 23.004 | 22.144 | 25.933 |
| | fm2' | 14.338 | 57.852 | 73.291 | 38.258 |
| 12 | D | 4.959104 | 3.440555 | 4.61006 | 3.850884 |
| | Dmax | 4.994802 | 3.564038 | 4.92238 | 3.850884 |
| | D/Dmax | 0.992853 | 0.9653531 | 0.936551 | 1 |

Other Exemplary Embodiments

While various exemplary embodiments of the disclosure have been described above, the disclosure is not limited to the exemplary embodiments, and various modifications and changes can be made within the spirit of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-156673, filed Sep. 29, 2022, which is hereby incorporated by reference herein in its entirety.

What is claimed is:

1. A lens apparatus having a zooming function and configured to be attached to an imaging apparatus, the lens apparatus comprising:
   a storage unit configured to store correction data regarding distortion aberrations of the lens apparatus, the correction data being in association with a plurality of focal lengths of the lens apparatus; and
   a communication unit configured to transmit the correction data to the imaging apparatus,
   wherein the correction data includes a coefficient $k_1$ of a term with a degree of 2, a coefficient $k_2$ of a term with a degree of 4, and a coefficient $k_3$ of a term with a degree of 6 in at least a hexic polynomial with respect to an image height r,
   wherein focal lengths fm1 and fm2 are defined as:

$$fm1 = z^{0.15} fw, \text{ and}$$

$$fm2 = z^{0.5} fw,$$

where fw represents a focal length of the lens apparatus at a wide-angle end, ft represents a focal length of the lens apparatus at a telephoto end, and z represents a zoom ratio of the lens apparatus,
   wherein the plurality of focal lengths includes a focal length in a range greater than or equal to fm1 and less than or equal to fm2, and
   wherein $$0 \leq |A_t/A_w| < 1$$

is satisfied, where $A_w$ and $A_t$ are defined as:

$$A_w = (k_{1m} - k_{1w})/(fm - fw), \text{ and}$$

$$A_t = (k_{1t} - k_{1m})/(ft - fm),$$

where fm represents a focal length at which $k_1$ becomes maximum within the range greater than or equal to fm1 and less than or equal to fm2, $k_{1w}$ represents a value of $k_1$ at fw, $k_{1m}$ represents a value of $k_1$ at fm, and $k_{1t}$ represents a value of $k_1$ at ft.

2. The lens apparatus according to claim 1, wherein $$k_{1t}/k_{1w}<0$$

is satisfied.

3. The lens apparatus according to claim 1, wherein $$0 \leq |B_t/B_w| < 1$$

is satisfied, where $B_w$ and $B_t$ are respectively defined as:

$$B_w=(k_{2m}-k_{2w})/(fm-fw), \text{ and}$$

$$B_t=(k_{2t}-k_{2m})/(ft-fm),$$

where $k_{2w}$ represents a value of $k_2$ at fw, $k_{2m}$ represents a value of $k_2$ at fm, and $k_{2t}$ represents a value of $k_2$ at ft.

4. The lens apparatus according to claim 1, wherein $$-0.3 \leq k_{2t}/k_{2w} \leq 0.1$$

is satisfied.

5. The lens apparatus according to claim 1, wherein $$-0.1 \leq k_{2w}/k_{1w}<0, \text{ and}$$

$$-0.02 \leq k_{2t}/k_{1t} \leq 0.01$$

are satisfied.

6. The lens apparatus according to claim 1, wherein $$0 \leq |C_t/C_w| < 1$$

is satisfied, where $C_w$ and $C_t$ are respectively defined as:

$$C_w=(k_{3m}-k_{3w})/(fm-fw), \text{ and}$$

$$C_t=(k_{3t}-k_{3m})/(ft-fm),$$

where $k_{3w}$ represents a value of $k_3$ at fw, $k_{3m}$ represents a value of $k_3$ at fm, and $k_{3t}$ represents a value of $k_3$ at ft.

7. The lens apparatus according to claim 1, wherein $$-0.3 \leq k_{3t}/k_{3w} \leq 0.1$$

is satisfied.

8. The lens apparatus according to claim 1, further comprising a first lens group disposed closest to an object, the first lens group being configured not to be moved for zooming and having positive refractive power,
   wherein the first lens group includes a sub-lens group configured to be moved for focusing.

9. The lens apparatus according to claim 8, wherein the correction data corresponds to the sub-lens group at a movement amount x in focusing from infinity to a closest distance, the sub-lens group satisfying $$0 \leq x \leq 0.5d,$$

where d represents a movement amount of the sub-lens group in focusing from infinity to the closest distance.

10. The lens apparatus according to claim 1, wherein $$-1 < A_t/A_w < 0$$

is satisfied.

11. The lens apparatus according to claim 1, wherein a focal length fm' at which $k_1$ becomes maximum satisfies $$fm1' \leq fm' \leq fm2',$$

where the focal lengths fm1' and fm2' are respectively defined as:

$$fm1'=z^{0.20}fw, \text{ and}$$

$$fm2'=z^{0.45}fw.$$

12. The lens apparatus according to claim 1, wherein $$D/D\,max \geq 0.90$$

is satisfied, where D max represents a maximum distortion aberration in an entire zoom range at each object distance of the lens apparatus, and D represents a maximum distortion aberration of the distortion aberrations corresponding to the correction data.

13. An imaging system comprising:
   the lens apparatus according to claim 1; and
   an imaging apparatus to which the lens apparatus is attached.

14. An imaging apparatus to which a lens apparatus having a zooming function is attached, the imaging apparatus comprising:
   a storage unit configured to store correction data regarding distortion aberrations of the lens apparatus, the correction data being in association with a plurality of focal lengths of the lens apparatus; and
   a communication unit configured to receive, from the lens apparatus, data about a focal length of the lens apparatus,
   wherein the correction data includes a coefficient $k_1$ of a term with a degree of 2, a coefficient $k_2$ of a term with a degree of 4, and a coefficient $k_3$ of a term with a degree of 6 in at least a hexic polynomial with respect to an image height r,
   wherein focal lengths fm1 and fm2 are defined as:

$$fm1=z^{0.15}fw, \text{ and}$$

$$fm2=z^{0.5}fw,$$

where fw represents a focal length of the lens apparatus at a wide-angle end, ft represents a focal length of the lens apparatus at a telephoto end, and z represents a zoom ratio of the lens apparatus,
   wherein the plurality of focal lengths includes a focal length in a range greater than or equal to fm1 and less than or equal to fm2, and
   wherein $$0 \leq |A_t/A_w| < 1$$

is satisfied, where $A_w$ and $A_t$ are defined as:

$$A_w=(k_{1m}-k_{1w})/(fm-fw), \text{ and}$$

$$A_t=(k_{1t}-k_{1m})/(ft-fm),$$

where fm represents a focal length at which $k_1$ becomes maximum within the range greater than or equal to fm1 and less than or equal to fm2, $k_{1w}$ represents a value of $k_1$ at fw, $k_{1m}$ represents a value of $k_1$ at fm, and $k_{1t}$ represents a value of $k_1$ at ft.

15. The imaging apparatus according to claim 14, further comprising a processing unit configured to process, based on the correction data, image data acquired via the lens apparatus.

16. An imaging system comprising:
   the imaging apparatus according to claim 14; and
   a lens apparatus which is attached to the imaging apparatus.

17. A processing apparatus configured to process image data acquired via a lens apparatus having a zooming function, the processing apparatus comprising:
   a storage unit configured to store correction data regarding distortion aberrations of the lens apparatus, the correction data being in association with a plurality of focal lengths of the lens apparatus; and a communication unit configured to receive data regarding a focal length of the lens apparatus,
wherein the correction data includes a coefficient $k_1$ of a term with a degree of 2, a coefficient $k_2$ of a term with a degree of 4, and a coefficient $k_3$ of a term with a degree of 6 in at least a hexic polynomial with respect to an image height r,
wherein focal lengths fm1 and fm2 are defined as:

$$fm1 = z^{0.15} fw, \text{ and}$$

$$fm2 = z^{0.5} fw,$$

where fw represents a focal length of the lens apparatus at a wide-angle end, ft represents a focal length of the lens apparatus at a telephoto end, and z represents a zoom ratio of the lens apparatus,
wherein the plurality of focal lengths includes a focal length in a range greater than or equal to fm1 and less than or equal to fm2, and
wherein $$0 \le |A_t/A_w| < 1$$

is satisfied, where $A_w$ and $A_t$ are defined as:

$$A_w = (k_{1m} - k_{1w})/(fm - fw), \text{ and}$$

$$A_t = (k_{1t} - k_{1m})/(ft - fm),$$

where fm represents a focal length at which $k_1$ becomes maximum within the range greater than or equal to fm1 and less than or equal to fm2, $k_{1w}$ represents a value of $k_1$ at fw, $k_{1m}$ represents a value of $k_1$ at fm, and $k_{1t}$ represents a value of $k_1$ at ft.

18. The processing apparatus according to claim 17, further comprising a processing unit configured to process, based on the correction data, image data acquired via the lens apparatus.

19. A non-transitory computer-readable storage medium storing a program for causing a computer to execute a method for processing image data acquired via a lens apparatus having a zooming function, the method comprising:
reading, from a storage unit, correction data regarding distortion aberrations of the lens apparatus, the correction data being in association with a plurality of focal lengths of the lens apparatus,
wherein the correction data includes a coefficient $k_1$ of a term with a degree of 2, a coefficient $k_2$ of a term with a degree of 4, and a coefficient $k_3$ of a term with a degree of 6 in at least a hexic polynomial with respect to an image height r,
wherein focal lengths fm1 and fm2 are defined as:

$$fm1 = z^{0.15} fw, \text{ and}$$

$$fm2 = z^{0.5} fw,$$

where fw represents a focal length of the lens apparatus at a wide-angle end, ft represents a focal length of the lens apparatus at a telephoto end, and z represents a zoom ratio of the lens apparatus,
wherein the plurality of focal lengths includes a focal length in a range greater than or equal to fm1 and less than or equal to fm2, and
wherein $$0 \le |A_t/A_w| < 1$$

is satisfied, where $A_w$ and $A_t$ are defined as:

$$A_w = (k_{1m} - k_{1w})/(fm - fw), \text{ and}$$

$$A_t = (k_{1t} - k_{1m})/(ft - fm),$$

where fm represents a focal length at which $k_1$ becomes maximum within the range greater than or equal to fm1 and less than or equal to fm2, $k_{1w}$ represents a value of $k_1$ at fw, $k_{1m}$ represents a value of $k_1$ at fm, and $k_{1t}$ represents a value of $k_1$ at ft.

* * * * *